(12) United States Patent
Azuma et al.

(10) Patent No.: US 10,379,451 B2
(45) Date of Patent: Aug. 13, 2019

(54) POLYARYLATE RESIN AND ELECTROPHOTOGRAPHIC PHOTOSENSITIVE MEMBER

(71) Applicant: KYOCERA Document Solutions Inc., Osaka (JP)

(72) Inventors: Jun Azuma, Osaka (JP); Kensuke Okawa, Osaka (JP); Akihiko Ogata, Osaka (JP); Kenji Kitaguchi, Osaka (JP); Tomofumi Shimizu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/904,527

(22) Filed: Feb. 26, 2018

(65) Prior Publication Data
US 2018/0246424 A1  Aug. 30, 2018

(30) Foreign Application Priority Data
Feb. 28, 2017 (JP) .................................. 2017-036068

(51) Int. Cl.
| | | |
|---|---|---|
| *G03G 5/05* | (2006.01) | |
| *G03G 5/047* | (2006.01) | |
| *G03G 5/06* | (2006.01) | |
| *C08G 63/672* | (2006.01) | |
| *C08G 63/91* | (2006.01) | |
| *C08G 63/682* | (2006.01) | |

(52) U.S. Cl.
CPC .......... *G03G 5/0589* (2013.01); *G03G 5/047* (2013.01); *G03G 5/056* (2013.01); *G03G 5/0614* (2013.01); *G03G 5/0668* (2013.01); *G03G 5/0672* (2013.01); *C08G 63/672* (2013.01); *C08G 63/6826* (2013.01); *C08G 63/916* (2013.01); *G03G 2215/00957* (2013.01)

(58) Field of Classification Search
CPC ..... G03G 5/056; G03G 5/0589; G03G 5/0614
See application file for complete search history.

(56) References Cited

U.S. PATENT DOCUMENTS

| | | | | | |
|---|---|---|---|---|---|
| 4,283,523 | A | * | 8/1981 | Salee ..................... | C08G 63/20 528/126 |
| 5,120,627 | A | * | 6/1992 | Nozomi ............... | G03G 5/0525 427/74 |
| 5,800,955 | A | * | 9/1998 | Kashimura .......... | G03G 5/0503 430/59.6 |
| 8,877,411 | B2 | * | 11/2014 | Jun ...................... | G03G 5/0564 399/159 |
| 2007/0281227 | A1 | * | 12/2007 | Maruo .................... | G03G 5/047 430/58.05 |
| 2010/0247148 | A1 | * | 9/2010 | Haruyama ......... | G03G 5/14765 399/159 |
| 2011/0206411 | A1 | * | 8/2011 | Mizushima ............... | G03G 5/04 399/111 |
| 2013/0122408 | A1 | * | 5/2013 | Haruyama ............. | G03G 15/75 430/56 |
| 2015/0370189 | A1 | * | 12/2015 | Tanaka ............... | G03G 9/08755 430/108.1 |
| 2016/0124327 | A1 | * | 5/2016 | Fujii ...................... | G03G 5/047 399/159 |

FOREIGN PATENT DOCUMENTS

| | | | |
|---|---|---|---|
| JP | H10-020514 A | | 1/1998 |
| JP | 10254161 A | * | 9/1998 |

OTHER PUBLICATIONS

English language machine translation of JP 10-254161 (Sep. 1998).*

* cited by examiner

*Primary Examiner* — Christopher D Rodee
(74) *Attorney, Agent, or Firm* — Studebaker & Brackett PC

(57) ABSTRACT

A polyarylate resin includes at least one type of repeating unit represented by a general formula (1), at least one type of repeating unit represented by a general formula (2), and a terminal group represented by a general formula (3). $R^1$, $R^2$, $R^3$, and $R^4$ each represent, independently of one another, a hydrogen atom or a methyl group. $R^5$ and $R^6$ each represent, independently of each other, a hydrogen atom or a $C_{1-4}$ alkyl group. $R^5$ and $R^6$ may bond together to represent a $C_{5-7}$ cycloalkylidene group. $X^1$ represents a divalent group represented by a chemical formula (2A), (2B), (2C), or (2D) with the proviso that when only one type of repeating unit represented by the general formula (2) is included, $X^1$ does not represent a divalent group represented by the chemical formula (2D). $R^f$ represents a chain aliphatic group having at least one fluoro group.

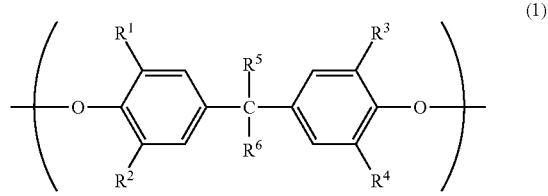

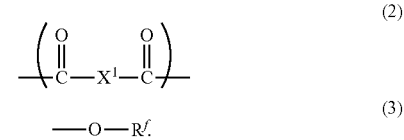

3 Claims, 2 Drawing Sheets

POLYARYLATE RESIN AND ELECTROPHOTOGRAPHIC PHOTOSENSITIVE MEMBER

INCORPORATION BY REFERENCE

The present application claims priority under 35 U.S.C. § 119 to Japanese Patent Application No. 2017-036068, filed on Feb. 28, 2017. The contents of this application are incorporated herein by reference in their entirety.

BACKGROUND

The present disclosure relates to a polyarylate resin and an electrophotographic photosensitive member.

An electrophotographic photosensitive member is used as an image bearing member in an electrophotographic image forming apparatus (for example, a printer or a copier). The electrophotographic photosensitive member includes a photosensitive layer. A single-layer electrophotographic photosensitive member and a multi-layer electrophotographic photosensitive member are each used as the electrophotographic photosensitive member, for example. The single-layer electrophotographic photosensitive member includes a photosensitive layer of a single layer structure having a charge generating function and a charge transport function. The multi-layer electrophotographic photosensitive member includes a photosensitive layer that includes a charge generating layer having the charge generating function and a charge transport layer having the charge transport function.

There is for example a known electrophotographic photosensitive member that contains a polyarylate resin synthesized from a dibasic carboxylic acid component having a specific structure and a dihydric phenol component.

SUMMARY

A polyarylate resin according to the present disclosure includes at least one type of repeating unit represented by a general formula (1), at least one type of repeating unit represented by a general formula (2), and a terminal group represented by a general formula (3).

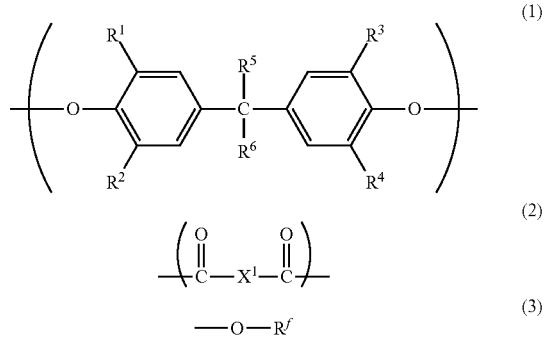

In the general formula (1), $R^1$, $R^2$, $R^3$, and $R^4$ each represent, independently of one another, a hydrogen atom or a methyl group. $R^5$ and $R^6$ each represent, independently of each other, a hydrogen atom or an alkyl group having a carbon number of at least 1 and no greater than 4. $R^5$ and $R^6$ may bond together to represent a cycloalkylidene group having a carbon number of at least 5 and no greater than 7. In the general formula (2), $X^1$ represents a divalent group represented by a chemical formula (2A), (2B), (2C), or (2D) with the proviso that when only one type of repeating unit represented by the general formula (2) is included, $X^1$ does not represent a divalent group represented by the chemical formula (2D). In the general formula (3), $R^f$ represents a chain aliphatic group having at least one fluoro group.

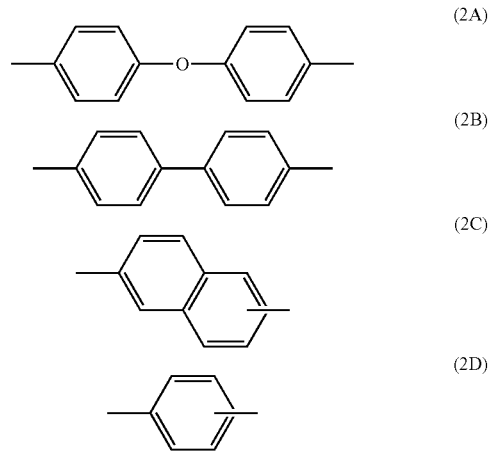

An electrophotographic photosensitive member according to the present disclosure includes a conductive substrate and a photosensitive layer. The photosensitive layer contains a charge generating material, a hole transport material, and a binder resin. The binder resin includes the above-described polyarylate resin.

DETAILED DESCRIPTION

Figure 1A:
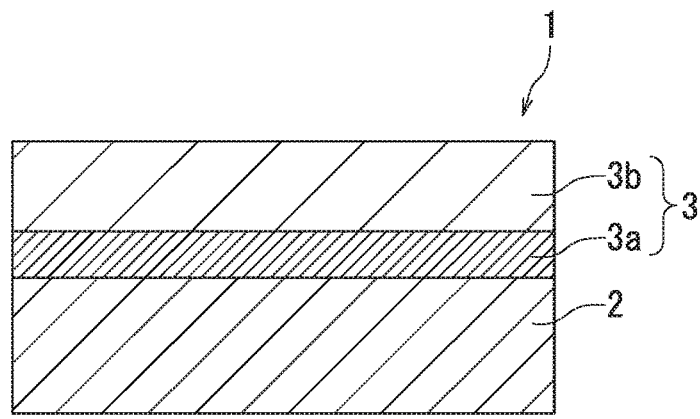
FIGS. 1A, 1B, and 1C are each a cross-sectional partial view illustrating an example of an electrophotographic photosensitive member containing a polyarylate resin according to an embodiment of the present disclosure.

The following describes an embodiment of the present disclosure in detail. However, the present disclosure is by no means limited to the embodiment described below. The present disclosure is practicable within the scope of the object of the present disclosure with various alterations made as appropriate. Although some overlapping explanations may be omitted as appropriate, such omission does not limit the gist of the present disclosure. In the following description, the term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof.

In the following description, an alkyl group having a carbon number of at least 1 and no greater than 8; an alkyl group having a carbon number of at least 1 and no greater than 6; an alkyl group having a carbon number of at least 1 and no greater than 4; an alkoxy group having a carbon number of at least 1 and no greater than 8; an alkoxy group having a carbon number of at least 1 and no greater than 4; a cycloalkane having a carbon number of at least 5 and no greater than 7; and a cycloalkylidene group having a carbon number of at least 5 and no greater than 7 mean the followings unless otherwise stated.

The alkyl group having a carbon number of at least 1 and no greater than 8, the alkyl group having a carbon number of at least 1 and no greater than 6, and the alkyl group having a carbon number of at least 1 and no greater than 4 are each an unsubstituted straight or branched alkyl group. Examples of alkyl groups having a carbon number of at least 1 and no greater than 8 include methyl group, ethyl group, n-propyl group, isopropyl group, n-butyl group, sec-butyl group, tert-butyl group, n-pentyl group, isopentyl group, neopentyl group, 1,2-dimethylpropyl group, hexyl group, heptyl group, and octyl group. Examples of alkyl groups having a carbon number of at least 1 and no greater than 6 are alkyl groups having a carbon number of at least 1 and no greater than 6 among the above-listed examples of alkyl groups having a carbon number of at least 1 and no greater than 8. Examples of alkyl groups having a carbon number of at least 1 and no greater than 4 are alkyl groups having a carbon number of at least 1 and no greater than 4 among the above-listed examples of alkyl groups having a carbon number of at least 1 and no greater than 8.

The alkoxy group having a carbon number of at least 1 and no greater than 8 and the alkoxy group having a carbon number of at least 1 and no greater than 4 are each an unsubstituted straight or branched alkoxy group. Examples of alkoxy groups having a carbon number of at least 1 and no greater than 8 include methoxy group, ethoxy group, n-propoxy group, isopropoxy group, n-butoxy group, sec-butoxy group, tert-butoxy group, n-pentoxy group, isopentoxy group, neopentoxy group, hexyloxy group, heptyloxy group, and octyloxy group. Examples of alkoxy groups having a carbon number of at least 1 and no greater than 4 are alkoxy groups having a carbon number of at least 1 and no greater than 4 among the above-listed examples of alkoxy groups having a carbon number of at least 1 and no greater than 8.

The cycloalkane having a carbon number of at least 5 and no greater than 7 is unsubstituted. Examples of cycloalkanes having a carbon number of at least 5 and no greater than 7 include cyclopentane, cyclohexane, and cycloheptane.

The cycloalkylidene group having a carbon number of at least 5 and no greater than 7 is unsubstituted. Examples of cycloalkylidene groups having a carbon number of at least 5 and no greater than 7 include cyclopentylidene group, cyclohexylidene group, and cycloheptylidene group. The cycloalkylidene group having a carbon number of at least 5 and no greater than 7 is represented by a general formula shown below. In the general formula, t represents an integer of at least 1 and no greater than 3, and an asterisk represents a bond. It is preferable that t represents 2.

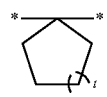

<Polyarylate Resin>

The present embodiment relates to a polyarylate resin. The polyarylate resin of the present embodiment includes at least one type of repeating unit represented by general formula (1), at least one type of repeating unit represented by general formula (2), and a terminal group represented by general formula (3). In the following description, a polyarylate resin including the at least one type of repeating unit represented by general formula (1), the at least one type of repeating unit represented by general formula (2), and the terminal group represented by general formula (3) may be referred to as a polyarylate resin (PA). Further, a repeating unit represented by general formula (1), a repeating unit represented by general formula (2), and the terminal group represented by general formula (3) may be referred to as a repeating unit (1), a repeating unit (2), and a terminal group (3), respectively.

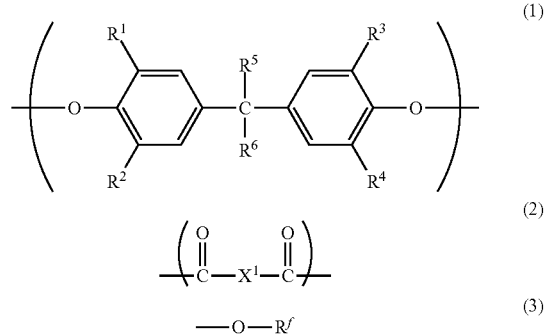

(1)

(2)

(3)

In general formula (1), $R^1$, $R^2$, $R^3$, and $R^4$ each represent, independently of one another, a hydrogen atom or a methyl group. $R^5$ and $R^6$ each represent, independently of each other, a hydrogen atom or an alkyl group having a carbon number of at least 1 and no greater than 4. $R^5$ and $R^6$ may bond together to represent a cycloalkylidene group having a carbon number of at least 5 and no greater than 7. In general formula (2), $X^1$ represents a divalent group represented by chemical formula (2A), (2B), (2C), or (2D) with the proviso that when the polyarylate resin (PA) includes only one type of repeating unit (2), $X^1$ does not represent a divalent group represented by chemical formula (2D). In general formula (3), $R^f$ represents a chain aliphatic group having at least one fluoro group.

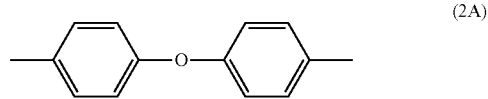

(2A)

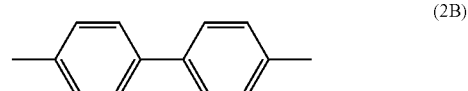

(2B)

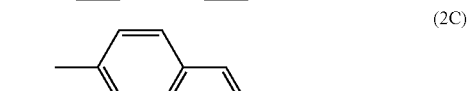

(2C)

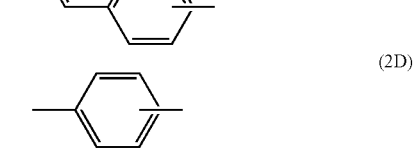

(2D)

When the polyarylate resin (PA) of the present embodiment is contained in a photosensitive layer, occurrence of filming on an electrophotographic photosensitive member (hereinafter may be referred to as a photosensitive member) can be prevented. Filming is a phenomenon in which minute matter is attached to a surface of the photosensitive member and adheres thereto. An example of the minute matter is a toner component. More specific examples of the minute matter are toner and an external additive separated from the toner. Another example of the minute matter is a non-toner component. More specific examples of the non-toner component is a minute component of a recording medium (for example, paper dust). Here, it is thought that frictional resistance of a surface of the photosensitive layer can be reduced in a configuration in which the photosensitive layer contains the polyarylate resin (PA) of the present embodiment. It is thought that as a result of the above, minute matter attached to the surface of the photosensitive layer can be sufficiently removed by a cleaning section of an image forming apparatus. As a consequence, occurrence of filming on the surface of the photosensitive layer can be prevented.

The polyarylate resin (PA) includes a main chain and the terminal group. The following describes the main chain and the terminal group of the polyarylate resin (PA).

[Main Chain]

The main chain of the polyarylate resin (PA) includes at least one type of repeating unit (1) and at least one type of repeating unit (2).

The main chain of the polyarylate resin (PA) includes no halogen atom. It is thought that as a result of the terminal group (3) having the fluoro group and the main chain including no halogen atom, compatibility of the polyarylate resin (PA) to a hole transport material improves and crystallization of the photosensitive layer can be sufficiently inhibited. Further, it is thought that as a result of the terminal group (3) having the fluoro group and the main chain including no halogen atom, the main chain tends to be entangled, enabling improvement in crack resistance and mechanical strength of the photosensitive layer.

The following describes the repeating unit (1). The alkyl group having a carbon number of at least 1 and no greater than 4 represented by $R^5$ and $R^6$ in general formula (1) is preferably a methyl group or an ethyl group.

The cycloalkylidene group having a carbon number of at least 5 and no greater than 7 that is a chemical group as a result of bonding between $R^5$ and $R^6$ in general formula (1) is preferably a cyclopentylidene group or a cyclohexylidene group, and more preferably a cyclohexylidene group.

Preferable examples of the repeating unit (1) include repeating units represented by chemical formulas (1-1), (1-2), (1-3), and (1-4). In the following description, a repeating unit represented by chemical formula (1-1), a repeating unit represented by chemical formula (1-2), a repeating unit represented by chemical formula (1-3), and a repeating unit represented by chemical formula (1-4) may be referred to as a repeating unit (1-1), a repeating unit (1-2), a repeating unit (1-3), and a repeating unit (1-4), respectively.

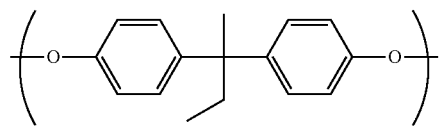

(1-1)

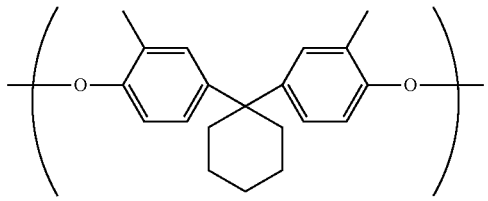

(1-2)

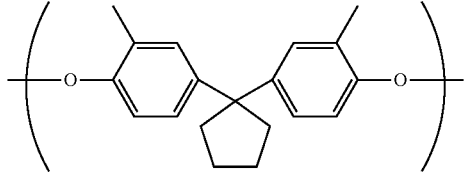

(1-3)

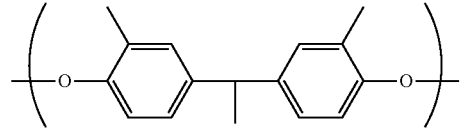

(1-4)

In order to improve filming resistance and abrasion resistance of the photosensitive member, it is preferable that in general formula (1), $R^1$, $R^2$, $R^3$, and $R^4$ each represent a hydrogen atom, $R^5$ represents a methyl group, and $R^6$ represents an ethyl group. The repeating unit (1-1) is the repeating unit (1) satisfying the above.

In order to improve filming resistance and abrasion resistance of the photosensitive member, it is also preferable that $R^1$ and $R^3$ each represent a methyl group, $R^2$ and $R^4$ each represent a hydrogen atom, and $R^5$ and $R^6$ bond together to represent a cycloalkylidene group having a carbon number of at least 5 and no greater than 7. Examples of repeating units (1) satisfying the above include the repeating units (1-2) and (1-3).

The polyarylate resin (PA) may include only one type of repeating unit (1). Alternatively, the polyarylate resin (PA) may include at least two types (for example, two types) of repeating units (1).

In a configuration in which the polyarylate resin (PA) includes a first repeating unit (1) and a second repeating unit (1) as two types of repeating units (1), a ratio (hereinafter may be referred to as a ratio r) of the number of first repeating units (1) to a sum of the number of the first repeating units (1) and the number of second repeating units (1) is preferably at least 0.10 and no greater than 0.90. Further, a ratio (hereinafter may be referred to as a ratio s) of the number of the second repeating units (1) to the sum of the number of the first repeating units (1) and the number of the second repeating units (1) is preferably at least 0.10 and no greater than 0.90.

The following describes the repeating unit (2). Examples of the repeating unit (2) include repeating units represented by general formulas (2-1) and (2-2). In the following description, a repeating unit represented by general formula (2-1) and a repeating unit represented by general formula (2-2) may be referred to as a repeating unit (2-1) and a repeating unit (2-2), respectively. In general formula (2-2), $X^2$ represents a divalent group represented by chemical formula (2A), (2B), or (2D).

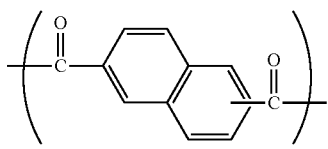

(2-1)

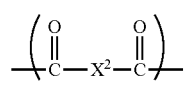

(2-2)

Examples of the repeating unit (2-1) include a repeating unit represented by chemical formula (2-1C) (hereinafter may be referred to as a repeating unit (2-1C)).

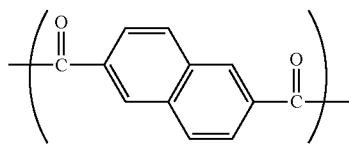

(2-1C)

Examples of the repeating unit (2-2) include repeating units represented by chemical formulas (2-2A), (2-2B), and (2-2D). In the following description, a repeating unit represented by chemical formula (2-2A), a repeating unit represented by chemical formula (2-2B), and a repeating unit represented by chemical formula (2-2D) may be referred to as a repeating unit (2-2A), a repeating unit (2-2B), and a repeating unit (2-2D), respectively.

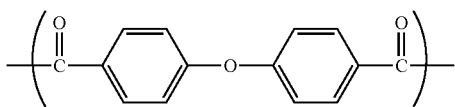

(2-2A)

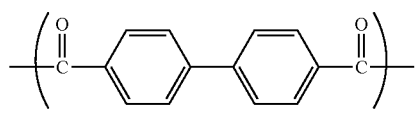

(2-2B)

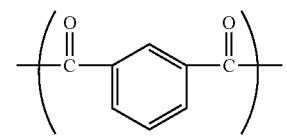

(2-2D)

The polyarylate resin (PA) may include only one type of repeating unit (2). When the polyarylate resin (PA) includes only one type of repeating unit (2), $X^1$ does not represent a divalent group represented by chemical formula (2D). That is, when the polyarylate resin (PA) includes only one type of repeating unit (2), $X^1$ represents a divalent group represented by chemical formula (2A), (2B), or (2C). When the polyarylate resin (PA) includes only one type of repeating unit (2), $X^1$ preferably represents a divalent group represented by chemical formula (2A).

In order to more effectively prevent occurrence of filming, it is preferable that the polyarylate resin (PA) includes at least two types (for example, two types) of repeating units (2). For the same reason, it is more preferable that the polyarylate resin (PA) includes at least two types of repeating units (2) including at least the repeating unit (2-1) and the repeating unit (2-2). For the same reason, it is further preferable that the polyarylate resin (PA) includes two types of repeating units (2) that are the repeating unit (2-1) and the repeating unit (2-2).

In order to improve filming resistance and abrasion resistance of the photosensitive member, it is preferable that the polyarylate resin (PA) includes the repeating unit (2-1C) and the repeating unit (2-2A) as the repeating units (2). For the same reason, it is also preferable that the polyarylate resin (PA) includes the repeating unit (2-1C) and the repeating unit (2-2B) as the repeating units (2). For the same reason, it is also preferable that the polyarylate resin (PA) includes the repeating unit (2-1C) and the repeating unit (2-2D) as the repeating units (2).

In order to improve filming resistance and abrasion resistance of the photosensitive member, a ratio (hereinafter may be referred to as a ratio p) of the number of repeating units (2-1) to a sum of the number of the repeating units (2-1) and the number of repeating units (2-2) is preferably at least 0.10 and less than 1.00. In order to improve filming resistance and abrasion resistance of the photosensitive member, the ratio p is more preferably at least 0.20, further preferably at least 0.30, still more preferably at least 0.40, and particularly preferably at least 0.60. Although no particular limitation is placed on the upper limit value of the ratio p as long as the ratio p is less than 1.00, the upper limit value may be for example 0.70 from a standpoint of workability.

In order to improve filming resistance and abrasion resistance of the photosensitive member, a ratio (hereinafter may be referred to as a ratio q) of the number of the repeating units (2-2) to the sum of the number of the repeating units (2-1) and the number of the repeating units (2-2) is preferably greater than 0.00 and no greater than 0.90. In order to improve filming resistance and abrasion resistance of the photosensitive member, the ratio q is more preferably no greater than 0.80, further preferably no greater than 0.70, still more preferably no greater than 0.60, and particularly preferably no greater than 0.40. Although no particular limitation is placed on the lower limit value of the ratio q as long as the ratio q is greater than 0.00, the lower limit value may be for example 0.30 from the standpoint of workability.

Each of the ratios p, q, r, and s is not a value obtained from a single molecular chain, but is an average value obtained from the whole polyarylate resin (PA) (a plurality of molecular chains) contained in the photosensitive layer. The ratios p, q, r, and s can be calculated from a $^1$H-NMR spectrum of the polyarylate resin (PA) measured using a proton nuclear magnetic resonance spectrometer.

[Terminal Group]

The polyarylate resin (PA) includes the terminal group (3). $R^f$ in general formula (3) represents a chain aliphatic group. The chain aliphatic group has at least one fluoro group. The chain aliphatic group is for example a straight or branched aliphatic group. The number of fluoro groups that the chain aliphatic group has is for example at least 1 and no greater than 13. Note that the terminal group (3) is non-cyclic. As a result of the terminal group (3) being non-cyclic and having the chain aliphatic group, filming resistance of the photosensitive member can be improved.

Preferable examples of the terminal group (3) include a terminal group represented by general formula (3-1) (hereinafter may be referred to as a terminal group (3-1)). As a result of the polyarylate resin (PA) including the terminal group (3-1), frictional resistance of the surface of the photosensitive layer can be further reduced and filming resistance of the photosensitive member can be further improved.

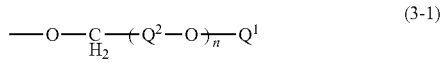
(3-1)

In general formula (3-1), $Q^1$ represents a straight or branched perfluoroalkyl group having a carbon number of at least 1 and no greater than 6. $Q^2$ represents a straight or branched perfluoroalkylene group having a carbon number of at least 1 and no greater than 6. Further, n represents an integer of at least 0 and no greater than 2. When n represents 2, two chemical groups $Q^2$ may be the same as or different from each other.

The straight or branched perfluoroalkyl group having a carbon number of at least 1 and no greater than 6 represented by $Q^1$ in general formula (3-1) is preferably a straight or branched perfluoroalkyl group having a carbon number of at least 3 and no greater than 6, more preferably a straight perfluoroalkyl group having a carbon number of at least 3 and no greater than 6, and further preferably a heptafluoro-n-propyl group or a tridecafluoro-n-hexyl group.

The straight or branched perfluoroalkylene group having a carbon number of at least 1 and no greater than 6 represented by $Q^2$ in general formula (3-1) is preferably a straight or branched perfluoroalkylene group having a carbon number of 2 or 3, and more preferably a 1-fluoro-1-trifluoromethyl-methylene group or 1,1,2-trifluoro-2-trifluoromethyl-ethylene group.

Preferably, n represents 0 or 2.

Further preferable examples of the terminal group (3) include terminal groups represented by chemical formulas (M1), (M2), (M3), and (M4). A terminal group represented by chemical formula (M1), a terminal group represented by chemical formula (M2), a terminal group represented by chemical formula (M3), and a terminal group represented by chemical formula (M4) may be referred to as a terminal group (M1), a terminal group (M2), a terminal group (M3), and a terminal group (M4), respectively. As a result of the polyarylate resin (PA) including the terminal group (M1), (M2), (M3), or (M4), frictional resistance of the surface of the photosensitive layer can be significantly reduced, and filming resistance of the photosensitive member can be significantly improved.

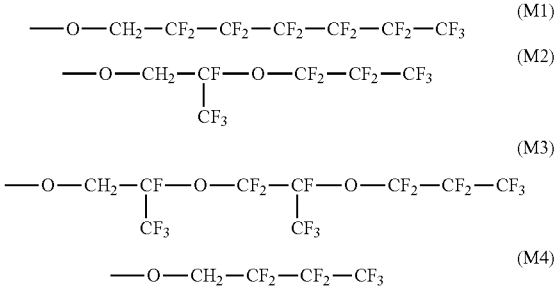

Among the terminal groups (M1), (M2), (M3), and (M4), the terminal groups (M1), (M3), and (M4) are preferable in terms of achieving further improvement of filming resistance of the photosensitive member. Frictional resistance of the surface of the photosensitive layer tends to be further reduced as the length of a carbon chain of the terminal group (3) is longer. Also, frictional resistance of the surface of the photosensitive layer tends to be further reduced as the number of fluoro groups that the terminal group (3) has is larger. Therefore, it is preferable that the terminal group (3) has a large number of carbon atoms and a large number of fluorine atoms. From the reasons described above, among the terminal groups (M1), (M2), (M3), and (M4), the terminal groups (M1) and (M3) are more preferable, and the terminal group (M3) is particularly preferable.

Through the above, the main chain and the terminal group of the polyarylate resin (PA) have been described. The following further describes the polyarylate resin (PA). In order to improve filming resistance and abrasion resistance of the photosensitive member, it is preferable that the polyarylate resin (PA) includes any of the following combinations of at least one repeating unit (1), at least one repeating unit (2), and a terminal group (3):

the at least one repeating unit (1) is the repeating unit (1-1), the at least one repeating unit (2) is the repeating units (2-1C) and (2-2A), and the terminal group (3) is the terminal group (M1);

the at least one repeating unit (1) is the repeating unit (1-1), the at least one repeating unit (2) is the repeating units (2-1C) and (2-2A), and the terminal group (3) is the terminal group (M2);

the at least one repeating unit (1) is the repeating unit (1-1), the at least one repeating unit (2) is the repeating units (2-1C) and (2-2A), and the terminal group (3) is the terminal group (M3); and the at least one repeating unit (1) is the repeating unit (1-1), the at least one repeating unit (2) is the repeating units (2-1C) and (2-2A), and the terminal group (3) is the terminal group (M4).

Among the above combinations, the combinations in which the terminal group (3) is any of the terminal groups (M1), (M3), and (M4) are more preferable. That is, it is more preferable that: the at least one repeating unit (1) is the repeating unit (1-1), the at least one repeating unit (2) is the repeating units (2-1C) and (2-2A), and the terminal group (3) is the terminal group (M1); the at least one repeating unit (1) is the repeating unit (1-1), the at least one repeating unit (2) is the repeating units (2-1C) and (2-2A), and the terminal group (3) is the terminal group (M3); or the at least one repeating unit (1) is the repeating unit (1-1), the at least one repeating unit (2) is the repeating units (2-1C) and (2-2A), and the terminal group (3) is the terminal group (M4).

In order to improve filming resistance and abrasion resistance of the photosensitive member, it is also preferable that the at least one repeating unit (1) is the repeating unit (1-1), the at least one repeating unit (2) is the repeating units (2-1C) and (2-2B), and the terminal group (3) is the terminal group (M1).

In order to improve filming resistance and abrasion resistance of the photosensitive member, it is also preferable that the polyarylate resin (PA) includes any of the following combinations of at least one repeating unit (1), at least one repeating unit (2), and a terminal group (3):

the at least one repeating unit (1) is the repeating unit (1-2), the at least one repeating unit (2) is the repeating units (2-1C) and (2-2A), and the terminal group (3) is the terminal group (M1);

the at least one repeating unit (1) is the repeating unit (1-2), the at least one repeating unit (2) is the repeating units (2-1C) and (2-2B), and the terminal group (3) is the terminal group (M1); and the at least one repeating unit (1) is the repeating unit (1-2), the at least one repeating unit (2) is the repeating units (2-1C) and (2-2D), the terminal group (3) is the terminal group (M1).

In order to improve filming resistance and abrasion resistance of the photosensitive member, it is also preferable that the at least one repeating unit (1) is the repeating units (1-2) and (1-3), the at least one repeating unit (2) is the repeating units (2-1C) and (2-2A), and the terminal group (3) is the terminal group (M1).

In the polyarylate resin (PA), a repeating unit derived from an aromatic diol is adjacent to and bonded to a repeating unit derived from an aromatic dicarboxylic acid. Also, in the polyarylate resin (PA), the terminal group (3) is adjacent to and bonded to a repeating unit derived from the aromatic dicarboxylic acid. Therefore, the number $N_{BP}$ of repeating units derived from the aromatic diol and the number $N_{DC}$ of repeating units derived from the aromatic dicarboxylic acid satisfy an equation "$N_{DC}=N_{BP}+1$" in the polyarylate resin (PA). In a configuration in which the polyarylate resin (PA) is a copolymer, the polyarylate resin (PA) may be for example a random copolymer, an alternating copolymer, a periodic copolymer, or a block copolymer.

The repeating unit derived from the aromatic diol is for example the repeating unit (1). In a configuration in which the polyarylate resin (PA) includes two or more types of repeating units (1), no particular limitation is placed on arrangement of one type of repeating unit (1) and the other type(s) of repeating unit (1). The one type of repeating unit (1) and the other type(s) of repeating unit (1) may be arranged randomly, alternately, periodically, or on a block by block basis, with the repeating unit (2) interposed therebetween. The repeating unit derived from the aromatic dicarboxylic acid is for example the repeating unit (2). In a configuration in which the polyarylate resin (PA) includes two or more types of repeating units (2), no particular limitation is placed on arrangement of one type of repeating unit (2) and the other type(s) of repeating unit (2). The one type of repeating unit (2) and the other type(s) of repeating unit (2) may be arranged randomly, alternately, periodically, or on a block-by-block basis, with the repeating unit (1) interposed therebetween.

The polyarylate resin (PA) may include only the repeating units (1) and (2) as repeating units. Alternatively, the polyarylate resin (PA) may further include a repeating unit that is derived from an aromatic diol and that is different from the repeating unit (1), in addition to the repeating unit (1). Also, the polyarylate resin (PA) may further include a repeating unit that is derived from an aromatic dicarboxylic acid and that is different from the repeating unit (2), in addition to the repeating unit (2).

The viscosity average molecular weight of the polyarylate resin (PA) is preferably at least 10,000, more preferably at least 20,000, further preferably at least 30,000, and particularly preferably at least 40,000. In a configuration in which the viscosity average molecular weight of the polyarylate resin (PA) is at least 10,000, abrasion resistance of a binder resin increases and a charge transport layer hardly wears down. By contrast, the viscosity average molecular weight of the binder resin is preferably no greater than 80,000, and more preferably no greater than 70,000. In a configuration in which the viscosity average molecular weight of the binder resin is no greater than 80,000, the polyarylate resin (PA) readily dissolves in a solvent for charge transport layer formation and a solvent for single-layer photosensitive layer formation, and formation of the charge transport layer and a single-layer photosensitive layer can be facilitated.

No particular limitation is placed on a method for producing the polyarylate resin (PA). Examples of methods for producing the polyarylate resin (PA) include condensation polymerization of an aromatic diol for forming a repeating unit, an aromatic dicarboxylic acid for forming a repeating unit, and a chain terminating agent for forming a terminal group. A known synthetic method (specific examples include solution polymerization, melt polymerization, and interfacial polymerization) may be adopted as the condensation polymerization.

At least one compound represented by general formula (BP-1) is for example used as the aromatic diol for forming a repeating unit. At least one compound represented by general formula (DC-2) is for example used as the aromatic dicarboxylic acid for forming a repeating unit. A compound represented by general formula (T-3) is used as the chain terminating agent for forming a terminal group. $R^1$, $R^2$, $R^3$, $R^4$, $R^5$, $R^6$, $X^1$, and $R^f$ in general formulas (BP-1), (DC-2), and (T-3) are respectively the same as $R^1$, $R^2$, $R^3$, $R^4$, $R^5$, $R^6$, $X^1$, and $R^f$ in general formulas (1), (2), and (3). In the following description, a compound represented by general formula (BP-1), a compound represented by general formula (DC-2), and a compound represented by general formula (T-3) may be referred to as a compound (BP-1), a compound (DC-2), and a compound (T-3), respectively.

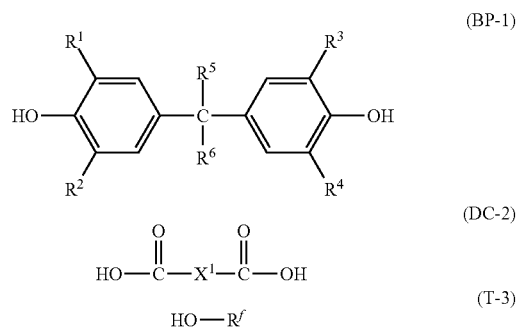

Preferable examples of the compound (BP-1) include a compound represented by chemical formula (BP-1-1), a compound represented by chemical formula (BP-1-2), a compound represented by chemical formula (BP-1-3), and a compound represented by chemical formula (BP-1-4) (hereinafter may be referred to as a compound (BP-1-1), a compound (BP-1-2), a compound (BP-1-3), and a compound (BP-1-4), respectively).

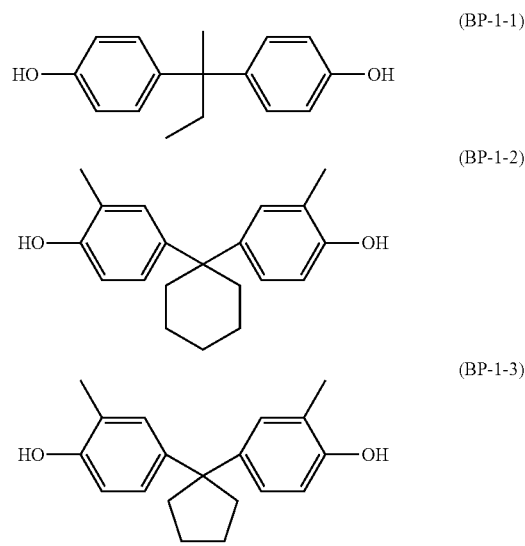

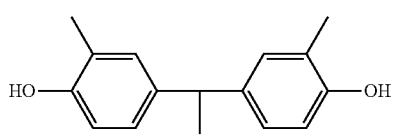
(BP-1-4)

Preferable examples of the compound (DC-2) include a compound represented by chemical formula (DC-2-1C), a compound represented by chemical formula (DC-2-2A), a compound represented by chemical formula (DC-2-2B), and a compound represented by chemical formula (DC-2-2D) (hereinafter may be referred to as a compound (DC-2-1C), a compound (DC-2-2A), a compound (DC-2-2B), and a compound (DC-2-2D), respectively).

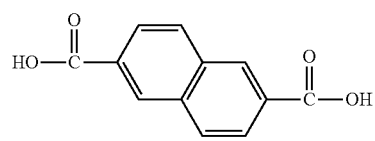
(DC-2-1C)

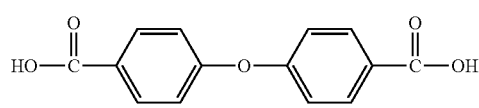
(DC-2-2A)

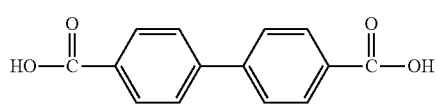
(DC-2-2B)

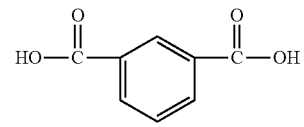
(DC-2-2D)

Preferable examples of the compound (T-3) include a compound represented by chemical formula (T-M1), a compound represented by chemical formula (T-M2), a compound represented by chemical formula (T-M3), and a compound represented by chemical formula (T-M4) (hereinafter may be referred to as a compound (T-M1), a compound (T-M2), a compound (T-M3), and a compound (T-M4), respectively).

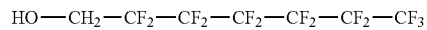
$HO-CH_2-CF_2-CF_2-CF_2-CF_2-CF_2-CF_3$ (T-M1)

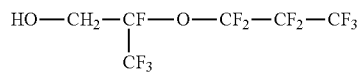
(T-M2)

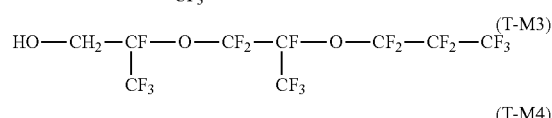
(T-M3)

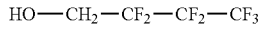
$HO-CH_2-CF_2-CF_2-CF_3$ (T-M4)

The aromatic diol (for example, the compound (BP-1)) for forming a repeating unit may be used in the form of an aromatic diacetate. The aromatic dicarboxylic acid (for example, the compound (DC-2)) for forming a repeating unit may be used in the form of a derivative thereof. Examples of derivatives of the aromatic dicarboxylic acid include aromatic dicarboxylic acid dichloride, aromatic dicarboxylic acid dimethyl ester, aromatic dicarboxylic acid diethyl ester, and aromatic dicarboxylic acid anhydride. The aromatic dicarboxylic acid dichloride is a compound obtained through substitution of two "—C(=O)—OH" groups of the aromatic dicarboxylic acid each with "—C(=O)—Cl" group.

Either or both of a base and a catalyst may be added in condensation polymerization of the aromatic diol and the aromatic dicarboxylic acid. A known base and a known catalyst may be appropriately selected as the base and the catalyst. Examples of the base include sodium hydroxide. Examples of the catalyst include benzyltributylammonium chloride, ammonium chloride, ammonium bromide, quaternary ammonium salt, triethylamine, and trimethylamine. Through the above, the polyarylate resin (PA) according to the present embodiment has been described.

<Photosensitive Member>

The following describes a photosensitive member that includes a photosensitive layer containing the polyarylate resin (PA) according to the present embodiment. The photosensitive member includes a conductive substrate and the photosensitive layer. The photosensitive layer contains a charge generating material, a hole transport material, and a binder resin. The photosensitive member may be a multi-layer electrophotographic photosensitive member (hereinafter may be referred to as a multi-layer photosensitive member) or a single-layer electrophotographic photosensitive member (hereinafter may be referred to as a single-layer photosensitive member).

(Multi-Layer Photosensitive Member)

Figure 1B:
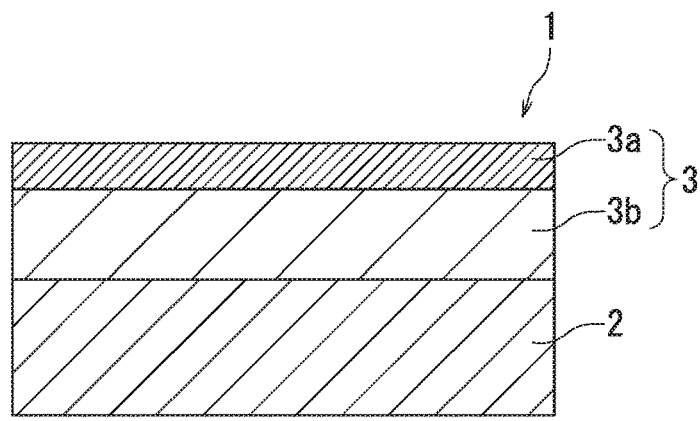
Figure 1C:
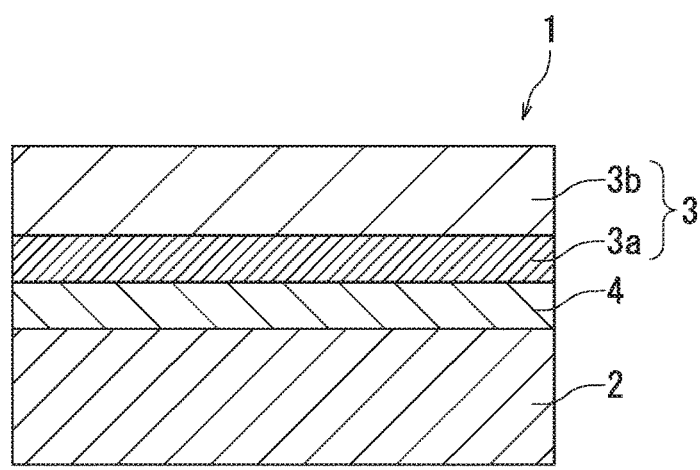

The following describes a multi-layer photosensitive member as an example of a photosensitive member 1, with reference to FIGS. 1A to 1C. FIGS. 1A to 1C are cross-sectional partial views each illustrating an example of the photosensitive member 1 (multi-layer photosensitive member). The photosensitive member 1 contains the polyarylate resin (PA) according to the present embodiment.

As illustrated in FIG. 1A, the multi-layer photosensitive member as the photosensitive member 1 includes for example a conductive substrate 2 and a photosensitive layer 3. The photosensitive layer 3 includes a charge generating layer 3a and a charge transport layer 3b. That is, the multi-layer photosensitive member includes the charge generating layer 3a and the charge transport layer 3b as the photosensitive layer 3.

In order to improve abrasion resistance of the multi-layer photosensitive member, it is preferable that the charge generating layer 3a is located on the conductive substrate 2 and the charge transport layer 3b is located on the charge generating layer 3a, as illustrated in FIG. 1A. However, as illustrated in FIG. 1B, the charge transport layer 3b may be located on the conductive substrate 2 and the charge generating layer 3a may be located on the charge transport layer 3b in the multi-layer photosensitive member as the photosensitive member 1.

The multi-layer photosensitive member as the photosensitive member 1 may include the conductive substrate 2, the photosensitive layer 3, and an intermediate layer 4 (undercoat layer), as illustrated in FIG. 1C. The intermediate layer 4 is located between the conductive substrate 2 and the photosensitive layer 3. The photosensitive layer 3 may be located directly on the conductive substrate 2, as illustrated in FIGS. 1A and 1B. Alternatively, the intermediate layer 4 may be interposed between the photosensitive layer 3 and the conductive substrate 2, as illustrated in FIG. 1C. Note that a protective layer 5 may be provided on the photosensitive layer 3 (see FIG. 2C).

Although the thickness of the charge generating layer 3a is not particularly limited, the thickness of the charge generating layer 3a is preferably at least 0.01 μm and no greater than 5 μm, and more preferably at least 0.1 μm and no greater than 3 μm. Although the thickness of the charge transport layer 3b is not particularly limited, the thickness of the charge transport layer 3b is preferably at least 2 μm and no greater than 100 μm, and more preferably at least 5 μm and no greater than 50 μm.

The charge generating layer 3a in the photosensitive layer 3 contains the charge generating material. The charge generating layer 3a may contain a binder resin for charge generating layer formation (hereinafter may be referred to as a base resin). The charge generating layer 3a may contain an additive as necessary.

The charge transport layer 3b in the photosensitive layer 3 contains the binder resin and the hole transport material. The charge transport layer 3b may contain an additive as necessary.

In order to prevent occurrence of filming, it is preferable that the charge transport layer 3b contains the polyarylate resin (PA) and is the topmost layer of the photosensitive member 1. Through the above, the multi-layer photosensitive member as an example of the photosensitive member 1 has been described with reference to FIGS. 1A to 1C.

(Single-Layer Photosensitive Member)

Figure 2A:
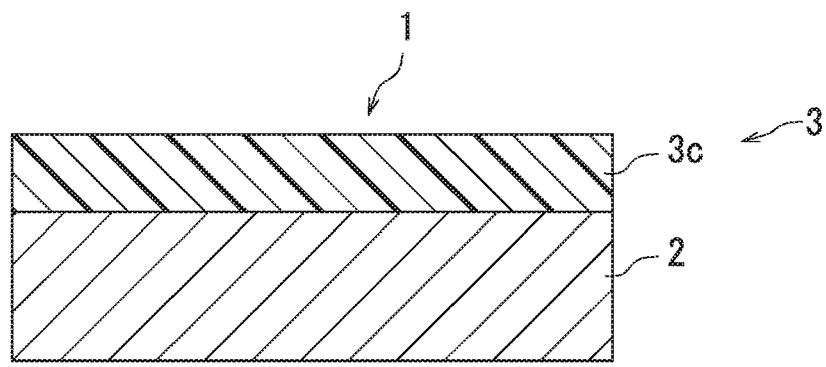
FIGS. 2A, 2B, and 2C are each a cross-sectional partial view illustrating another example of the electrophotographic photosensitive member containing the polyarylate resin according to the embodiment of the present disclosure.
Figure 2B:
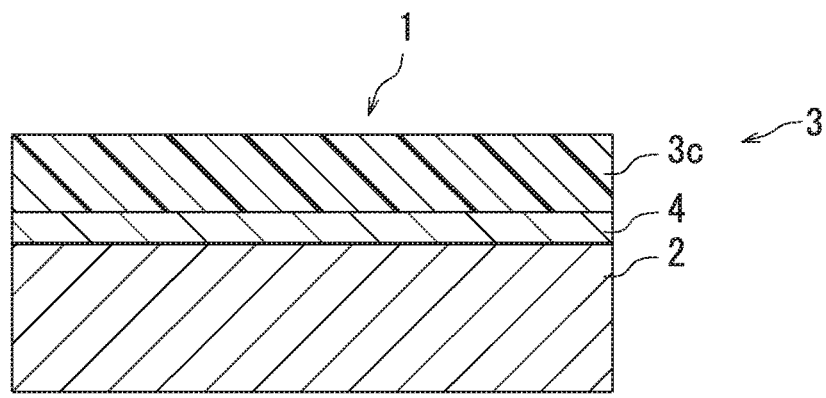
Figure 2C:
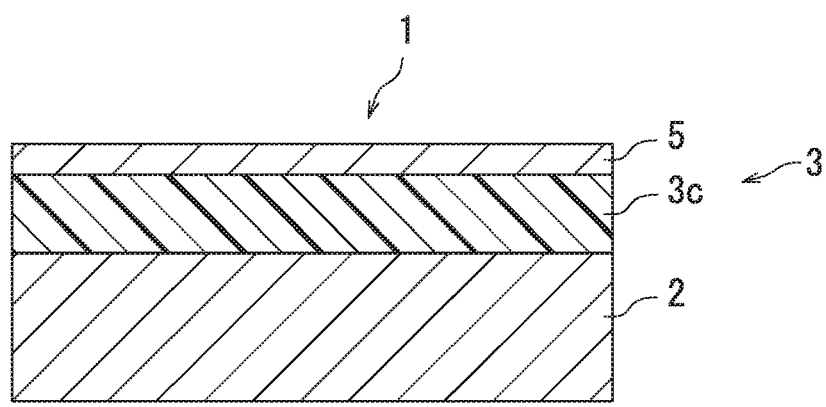

The following describes a single-layer photosensitive member as another example of the photosensitive member 1, with reference to FIGS. 2A to 2C. FIGS. 2A to 2C each are a cross-sectional partial view illustrating another example of the photosensitive member 1 (single-layer photosensitive member). The photosensitive member 1 contains the polyarylate resin (PA) according to the present embodiment.

As illustrated in FIG. 2A, the single-layer photosensitive member as the photosensitive member 1 includes for example a conductive substrate 2 and a photosensitive layer 3. The photosensitive layer 3 included in the single-layer photosensitive member as the photosensitive member 1 is a photosensitive layer having single-layer structure (hereinafter may be referred to as a single-layer photosensitive layer 3c).

As illustrated in FIG. 2B, the single-layer photosensitive member as the photosensitive member 1 may include the conductive substrate 2, the single-layer photosensitive layer 3c, and an intermediate layer 4 (undercoat layer). The intermediate layer 4 is located between the conductive substrate 2 and the single-layer photosensitive layer 3c. The photosensitive layer 3 may be located directly on the conductive substrate 2, as illustrated in FIG. 2A. Alternatively, the intermediate layer 4 may be interposed between the photosensitive layer 3 and the conductive substrate 2, as illustrated in FIG. 2B.

As illustrated in FIG. 2C, the single-layer photosensitive member as the photosensitive member 1 may include the conductive substrate 2, the single-layer photosensitive layer 3c, and a protective layer 5. The protective layer 5 is located on the single-layer photosensitive layer 3c.

Although the thickness of the single-layer photosensitive layer 3c is not particularly limited, the thickness of the single-layer photosensitive layer 3c is preferably at least 5 μm and no greater than 100 μm, and more preferably at least 10 μm and no greater than 50 μm.

The single-layer photosensitive layer 3c as the photosensitive layer 3 contains a charge generating material, a binder resin, and a hole transport material. The single-layer photosensitive layer 3c may further contain an electron transport material. The single-layer photosensitive layer 3c may contain an additive as necessary.

In order to prevent occurrence of filming, it is preferable that the single-layer photosensitive layer 3c contains the polyarylate resin (PA) and serves as the topmost layer of the photosensitive member 1. Through the above, the single-layer photosensitive member as another example of the photosensitive member 1 has been described with reference to FIGS. 2A to 1C. The following describes the photosensitive member in more detail.

(Binder Resin)

The photosensitive layer contains the binder resin. The binder resin includes the polyarylate resin (PA) described above. As described above, filming of occurrence on the photosensitive member can be prevented as a result of the photosensitive layer containing the polyarylate resin (PA). In a configuration in which the photosensitive member is a multi-layer photosensitive member, the charge transport layer contains the binder resin. In a configuration in which the photosensitive member is a single-layer photosensitive member, the single-layer photosensitive layer contains the binder resin.

The photosensitive layer may contain only the polyarylate resin (PA) as the binder resin. Alternatively, the photosensitive layer may further contain another binder resin (hereinafter may be referred to as the other binder resin) other than the polyarylate resin (PA), in addition to the polyarylate resin (PA). The polyarylate resin (PA) is contained in an amount of preferably at least 80% by mass relative to a total mass of the binder resin(s), more preferably at least 90% by mass, and particularly preferably 100% by mass.

Examples of the other binder resin include thermoplastic resins, thermosetting resins, and photocurable resins. Examples of the thermoplastic resins include polycarbonate resin, polyarylate resin other than the polyarylate resin (PA), styrene-butadiene copolymer, styrene-acrylonitrile copolymer, styrene-maleic acid copolymer, acrylic acid copolymer, styrene-acrylic acid copolymer, polyethylene resin, ethylene-vinyl acetate copolymer, chlorinated polyethylene resin, polyvinyl chloride resin, polypropylene resin, ionomer resin, vinyl chloride-vinyl acetate copolymer, alkyd resin, polyamide resin, urethane resin, polysulfone resin, diallyl phthalate resin, ketone resin, polyvinyl butyral resin, polyester resin, polyvinyl acetal resin, and polyether resin. Examples of the thermosetting resins include silicone resin, epoxy resin, phenolic resin, urea resin, and melamine resin. Examples of the photocurable resins include acrylic acid adducts of epoxy compounds and acrylic acid adducts of urethane compounds.

One of the above-listed binder resins may be used alone or two or more of the above-listed binder resins may be used in combination.

(Base Resin)

In a configuration in which the photosensitive member is a multi-layer photosensitive member, the charge generating layer contains a base resin. Examples of the base resin are the same as the above-listed examples of the other binder resin. One base resin may be used alone or two or more base resins may be used in combination. In order to form the charge generating layer and the charge transport layer favorably, it is preferable that the base resin contained in the charge generating layer differs from the binder resin contained in the charge transport layer.

(Hole Transport Material)

Examples of the hole transport material include triphenylamine derivatives, diamine derivatives (specific examples include N,N,N',N'-tetraphenylbenzidine derivative, N,N,N',N'-tetraphenylphenylenediamine derivative, N,N,N',N'-tetraphenylnaphtylenediamine derivative, N,N,N',N'-tetraphenylphenanthrylenediamine derivative, and di(aminophenylethenyl)benzene derivative), oxadiazole-based compounds (specific examples include 2,5-di(4-methylaminophenyl)-1,3,4-oxadiazole), styryl-based compounds (specific examples include 9-(4-diethylaminostyryl)anthracene), carbazole-based compounds (specific examples include polyvinyl carbazole), organic polysilane compounds, pyrazoline-based compounds (specific examples include 1-phenyl-3-(p-dimethylaminophenyl)pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds. One hole transport material may be used alone or two or more hole transport materials may be used in combination.

The hole transport material preferably includes a compound represented by general formula (10), (11), or (12). In the following description, a compound represented by general formula (10), a compound represented by general formula (11), and a compound represented by general formula (12) may be referred to as a compound (10), a compound (11), and a compound (12), respectively. As a result of the photosensitive layer containing the compound (10), (11), or (12) as the hole transport material, sensitivity characteristics of the photosensitive member can be improved as well as filming resistance and abrasion resistance of the photosensitive member.

The compound (10) is represented by general formula (10) shown below.

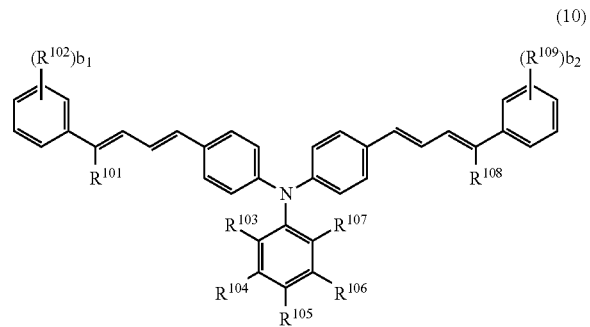

(10)

In general formula (10), $R^{101}$, $R^{103}$, $R^{104}$, $R^{105}$, $R^{106}$, $R^{107}$, and $R^{108}$ each represent, independently of one another, a hydrogen atom, an alkyl group having a carbon number of at least 1 and no greater than 8, a phenyl group which may have an alkyl group having a carbon number of at least 1 and no greater than 8, or an alkoxy group having a carbon number of at least 1 and no greater than 8. Two adjacent chemical groups among $R^{103}$, $R^{104}$, $R^{105}$, $R^{106}$, and $R^{107}$ may bond together to represent a cycloalkane having a carbon number of at least 5 and no greater than 7. $R^{102}$ and $R^{109}$ each represent, independently of each other, an alkyl group having a carbon number of at least 1 and no greater than 8, a phenyl group, or an alkoxy group having a carbon number of at least 1 and no greater than 8. Further, $b_1$ and $b_2$ each represent, independently of each other, an integer of at least 0 and no greater than 5.

The alkyl group having a carbon number of at least 1 and no greater than 8 represented by $R^{101}$ to $R^{109}$ in general formula (10) is preferably an alkyl group having a carbon number of at least 1 and no greater than 6, more preferably an alkyl group having a carbon number of at least 1 and no greater than 4, and further preferably a methyl group or an n-butyl group.

The phenyl group represented by $R^{101}$ to $R^{109}$ in general formula (10) may have an alkyl group having a carbon number of at least 1 and no greater than 8. The alkyl group having a carbon number of at least 1 and no greater than 8 that the phenyl group has is preferably an alkyl group having a carbon number of at least 1 and no greater than 6, more preferably an alkyl group having a carbon number of at least 1 and no greater than 4, and further preferably a methyl group.

The alkoxy group having a carbon number of at least 1 and no greater than 8 represented by $R^{101}$ to $R^{109}$ in general formula (10) is preferably an alkoxy group having a carbon number of at least 1 and no greater than 4, and more preferably a methoxy group or an ethoxy group.

Adjacent two chemical groups among $R^{103}$, $R^{104}$, $R^{105}$, $R^{106}$, and $R^{107}$ in general formula (10) may bond together to represent a cycloalkane having a carbon number of at least 5 and no greater than 7. For example, among $R^{103}$, $R^{104}$, $R^{105}$, $R^{106}$, and $R^{107}$, $R^{106}$ and $R^{107}$, which are adjacent to each other, may bond together to form a cycloalkane having a carbon number of at least 5 and no greater than 7. In a configuration in which adjacent two chemical groups among $R^{103}$, $R^{14}$, $R^{105}$, $R^{106}$, and $R^{107}$ bond together to form a cycloalkane having a carbon number of at least 5 and no greater than 7, the cycloalkane having a carbon number of at least 5 and no greater than 7 forms a fused bi-cyclic ring through fusion with a phenyl group with which $R^{103}$, $R^{104}$, $R^{105}$, $R^{106}$, and $R^{107}$ bond. In the above configuration, a double bond may be included in a part of fusion between the cycloalkane having a carbon number of at least 5 and no greater than 7 and the phenyl group. The cycloalkane having a carbon number of at least 5 and no greater than 7 that is represented as a result of bonding between adjacent two chemical groups among $R^{103}$, $R^{104}$, $R^{105}$, $R^{106}$, and $R^{107}$ is preferably cyclohexane.

When $b_1$ represents an integer of at least 2 and no greater than 5, a plurality of chemical groups $R^{102}$ may be the same as or different from one another. When $b_2$ represents an integer of at least 2 and no greater than 5, a plurality of chemical groups $R^{109}$ may be the same as or different from one another. Preferably, $b_1$ and $b_2$ each represent, independently of each other, 0 or 1.

Preferably, $R^{101}$ and $R^{108}$ in general formula (10) each represent a hydrogen atom or a phenyl group that has an alkyl group having a carbon number of at least 1 and no greater than 8. Preferably, $R^{102}$ and $R^{109}$ each represent an alkyl group having a carbon number of at least 1 and no greater than 8. Preferably, $R^{103}$, $R^{104}$, $R^{105}$, $R^{106}$ and $R^{107}$ each represent, independently of one another, a hydrogen atom, an alkyl group having a carbon number of at least 1 and no greater than 8, or an alkoxy group having a carbon number of at least 1 and no greater than 8. Alternatively, adjacent two chemical groups among $R^{103}$, $R^{104}$, $R^{105}$, $R^{106}$, and $R^{107}$ preferably bond together to form a cycloalkane having a carbon number of at least 5 and no greater than 7. Preferably, $b_1$ and $b_2$ each represent, independently of each other, 0 or 1.

In order to further improve filming resistance of the photosensitive member, $R^{101}$ and $R^{108}$ in general formula (10) each preferably represent a hydrogen atom. $R^{103}$, $R^{14}$, $R^{105}$, $R^{106}$, and $R^{107}$ each preferably represent, independently of one another, a hydrogen atom or an alkyl group having a carbon number of at least 1 and no greater than 8. Alternatively, adjacent two chemical groups among $R^{103}$, $R^{104}$, $R^{105}$, $R^{106}$, and $R^{107}$ preferably bond together to form a cycloalkane having a carbon number of at least 5 and no greater than 7. Further, $b_1$ and $b_2$ each preferably represent 0.

In order to improve abrasion resistance of the photosensitive member in addition to filming resistance thereof, $R^{101}$ and $R^{108}$ in general formula (10) each preferably represent a hydrogen atom. $R^{103}$, $R^{104}$, $R^{105}$, $R^{106}$, and $R^{107}$ each preferably represent, independently of one another, a hydrogen atom, an alkyl group having a carbon number of at least 1 and no greater than 8, or an alkoxy group having a carbon number of at least 1 and no greater than 8. Further, $b_1$ and $b_2$ each preferably represent 0.

In order to improve sensitivity characteristics of the photosensitive member in addition to filming resistance thereof, $R^{101}$ and $R^{108}$ in general formula (10) each preferably represent a phenyl group that has an alkyl group having a carbon number of at least 1 and no greater than 8. $R^{102}$ and $R^{109}$ each preferably represent an alkyl group having a carbon number of at least 1 and no greater than 8. $R^{103}$, $R^{104}$, $R^{105}$, $R^{106}$, and $R^{107}$ each preferably represent, independently of one another, a hydrogen atom or an alkoxy group having a carbon number of at least 1 and no greater than 8. Further, $b_1$ and $b_2$ each preferably represent 1.

Preferable examples of the compound (10) include compounds represented by chemical formulas (HTM-1), (HTM-2), (HTM-3), and (HTM-4). In the following description, a compound represented by chemical formula (HTM-1), a compound represented by chemical formula (HTM-2), a compound represented by chemical formula (HTM-3), and a compound represented by chemical formula (HTM-4) may be referred to as a compound (HTM-1), a compound (HTM-2), a compound (HTM-3), and a compound (HTM-4), respectively.

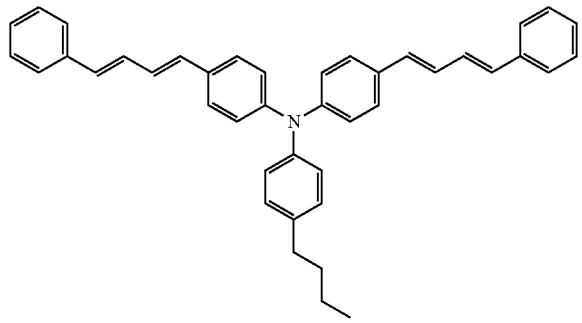

(HTM-1)

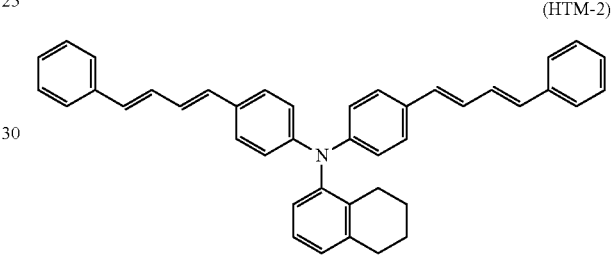

(HTM-2)

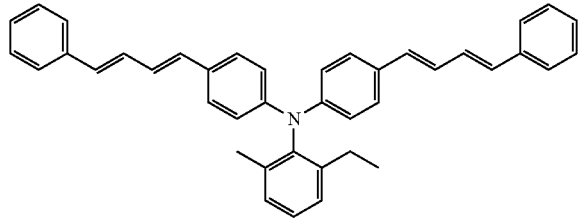

(HTM-3)

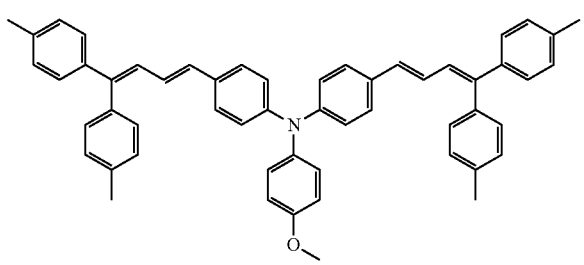

(HTM-4)

The compound (11) is represented by general formula (11) shown below.

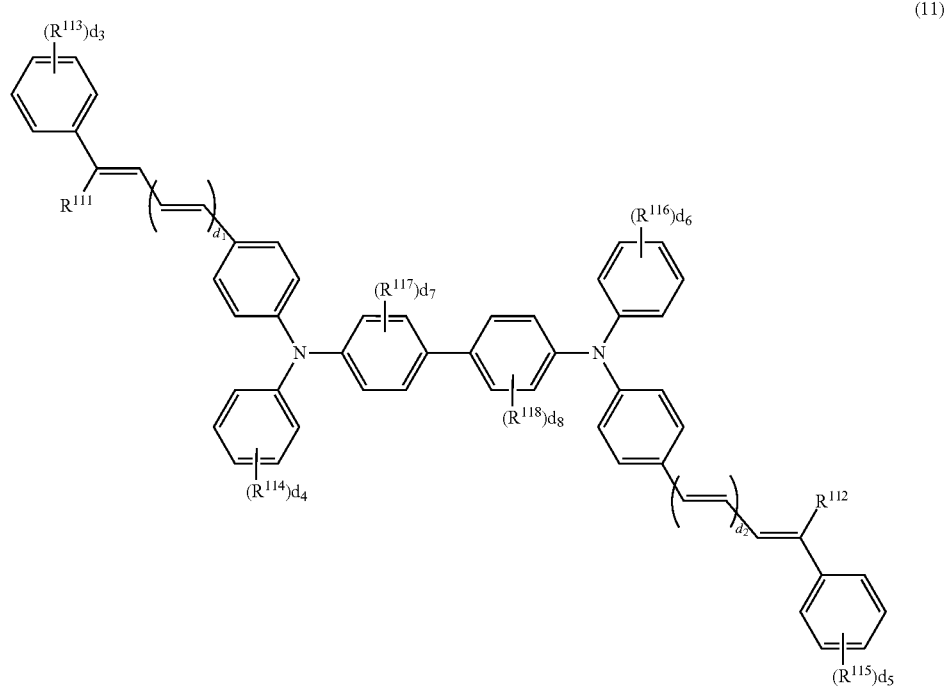

(11)

In general formula (11), $R^{111}$ and $R^{112}$ each represent, independently of each other, a hydrogen atom, an alkyl group having a carbon number of at least 1 and no greater than 8, or a phenyl group. $R^{113}$, $R^{114}$, $R^{115}$, $R^{116}$, $R^{117}$, and $R^{118}$ each represent, independently of one another, an alkyl group having a carbon number of at least 1 and no greater than 8 or a phenyl group. Further, $d_1$ and $d_2$ each represent, independently of each other, 0 or 1. Also, $d_3$, $d_4$, $d_5$, and $d_6$ each represent, independently of each other, an integer of at least 0 and no greater than 5. Also, $d_7$ and $d_8$ each represent, independently of each other, an integer of at least 0 and no greater than 4.

The alkyl group having a carbon number of at least 1 and no greater than 8 represented by $R^{111}$ to $R^{118}$ in general formula (11) is preferably an alkyl group having a carbon number of at least 1 and no greater than 4, and more preferably a methyl group or an ethyl group.

When $d_3$ in general formula (11) represents an integer of at least 2 and no greater than 5, a plurality of chemical groups $R^{113}$ may be the same as or different from one another. When $d_4$ represents an integer of at least 2 and no greater than 5, a plurality of chemical groups $R^{114}$ may be the same as or different from one another. When $d_5$ represents an integer of at least 2 and no greater than 5, a plurality of chemical groups $R^{115}$ may be the same as or different from one another. When $d_6$ represents an integer of at least 2 and no greater than 5, a plurality of chemical groups $R^{116}$ may be the same as or different from one another. When $d_7$ represents an integer of at least 2 and no greater than 4, a plurality of chemical groups $R^{117}$ may be the same as or different from one another. When $d_8$ represents an integer of at least 2 and no greater than 4, a plurality of chemical groups $R^{11s}$ may be the same as or different from one another.

In order to improve abrasion resistance of the photosensitive member in addition to filming resistance thereof, $R^{111}$ and $R^{112}$ in general formula (11) each preferably represent, independently of each other, a hydrogen atom or a phenyl group. $R^{113}$, $R^{114}$, $R^{115}$, $R^{116}$, $R^{117}$, and $R^{11s}$ each preferably represent, independently of one another, an alkyl group having a carbon number of at least 1 and no greater than 8. Preferably, $d_1$ and $d_2$ are the same as each other, and each represent 0 or 1. Preferably, $d_3$ and $d_5$ each represent 0. Preferably, $d_4$ and $d_6$ are the same as each other, and each represent 0 or 2. Preferably, $d_7$ and $d_8$ each represent 0.

In order to improve sensitivity characteristics of the photosensitive member in addition to filming resistance thereof, $R^{111}$ and $R^{112}$ in general formula (11) each preferably represent a hydrogen atom. $R^{113}$, $R^{114}$, $R^{115}$, $R^{116}$, $R^{117}$, and $R^{11s}$ each preferably represent, independently of one another, an alkyl group having a carbon number of at least 1 and no greater than 8. Preferably, $d_1$ and $d_2$ are the same as each other, and each represent 0 or 1. Preferably, $d_3$ and $d_5$ each represent 0. Preferably, $d_4$ and $d_6$ are the same as each other, and each represent 2. Preferably, $d_7$ and $d_8$ each represent 0.

Preferable examples of the compound (11) include compounds represented by chemical formulas (HTM-5), (HTM-6), and (HTM-7). In the following description, a compound represented by chemical formula (HTM-5), a compound represented by chemical formula (HTM-6), and a compound represented by chemical formula (HTM-7) may be referred to as a compound (HTM-5), a compound (HTM-6), and a compound (HTM-7), respectively.

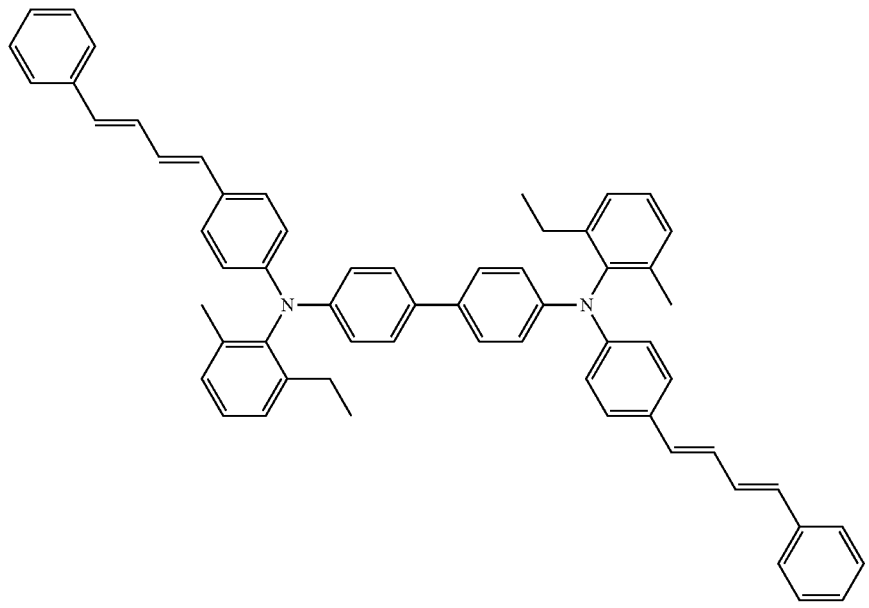

(HTM-5)

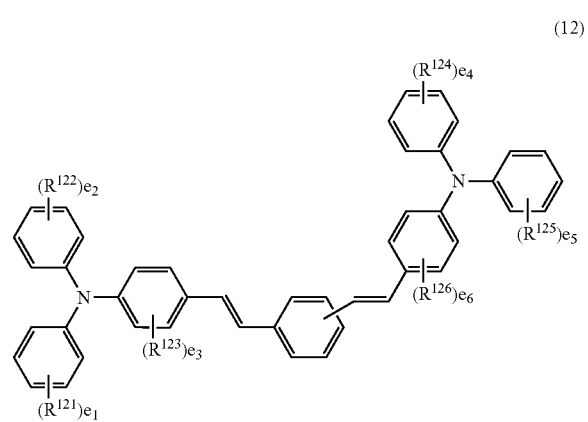

(HTM-6)

(HTM-7)

The compound (12) is represented by general formula (12) shown below.

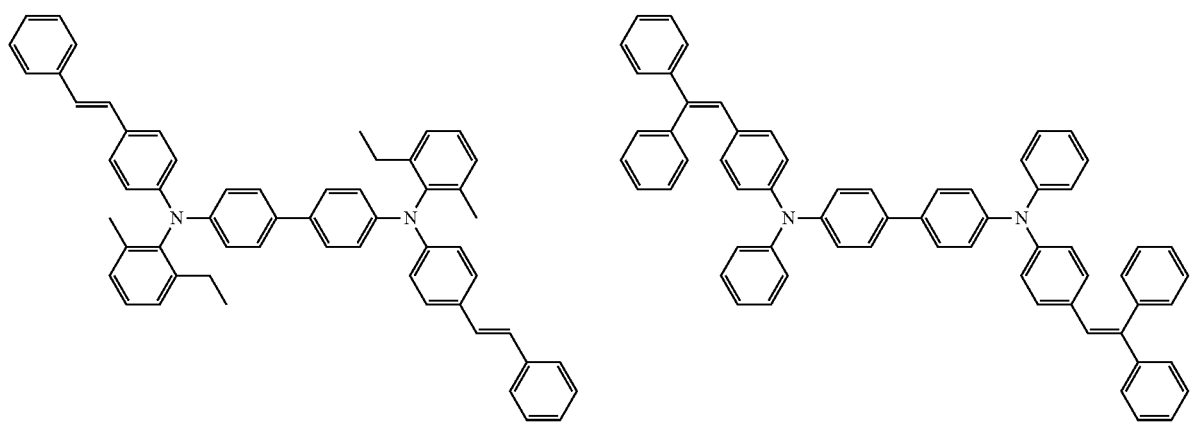

(12)

In general formula (12), $R^{121}$, $R^{122}$, $R^{123}$, $R^{124}$, $R^{125}$, and $R^{126}$ each represent, independently of one another, an alkyl group having a carbon number of at least 1 and no greater than 8, a phenyl group, or an alkoxy group having a carbon number of at least 1 and no greater than 8. Further, $e_1$, $e_2$, $e_4$, and $e_5$ each represent, independently of one another, an integer of at least 0 and no greater than 5. Also, $e_3$ and $e_6$ each represent, independently of each other, an integer of at least 0 and no greater than 4.

The alkyl group having a carbon number of at least 1 and no greater than 8 represented by $R^{121}$ to $R^{126}$ in general formula (12) is preferably an alkyl group having a carbon number of at least 1 and no greater than 4, and more preferably a methyl group or an ethyl group.

When $e_1$ in general formula (12) represents an integer of at least 2 and no greater than 5, a plurality of chemical groups $R^{121}$ may be the same as or different from one another. When $e_2$ represents an integer of at least 2 and no greater than 5, a plurality of chemical groups $R^{122}$ may be the same as or different from one another. When $e_3$ represents an integer of at least 2 and no greater than 4, a plurality of chemical groups $R^{123}$ may be the same as or different from one another. When $e_4$ represents an integer of at least 2 and no greater than 5, a plurality of chemical groups $R^{124}$ may be the same as or different from one another. When $e_5$ represents an integer of at least 2 and no greater than 5, a plurality of chemical groups $R^{125}$ may be the same as or different from one another. When $e_6$ represents an integer of at least 2 and no greater than 4, a plurality of chemical groups $R^{126}$ may be the same as or different from one another.

It is preferable that $e_1$, $e_2$, $e_4$, and $e_5$ in general formula (12) each represent, independently of one another, an integer of at least 0 and no greater than 2. It is more preferable that one of $e_1$ and $e_2$ represents 0, the other of $e_1$ and $e_2$ represents 2, one of $e_4$ and $e_5$ represents 0, and the other of $e_4$ and $e_5$ represents 2. It is also more preferable that $e_1$, $e_2$, $e_4$, and $e_5$ each represent 1. It is preferable that $e_3$ and $e_6$ each represent 0.

Preferably, $R^{121}$, $R^{122}$, $R^{123}$, $R^{124}$, $R^{125}$, and $R^{126}$ in general formula (12) each represent, independently of one another, an alkyl group having a carbon number of at least 1 and no greater than 8. Preferably, $e_1$, $e_2$, $e_4$, and $e_5$ each represent, independently of one another, an integer of at least 0 and no greater than 2. Preferably, $e_3$ and $e_6$ each represent 0.

In order to further improve filming resistance of the photosensitive member, $R^{121}$, $R^{122}$, $R^{124}$, and $R^{125}$ in general formula (12) each preferably represent, independently of one another, an alkyl group having a carbon number of at least 1 and no greater than 8. Preferably, $e_1$, $e_2$, $e_4$, and $e_5$ each represent 1. Preferably, $e_3$ and $e_6$ each represent 0.

In order to improve sensitivity characteristics of the photosensitive member in addition to filming resistance thereof, $R^{121}$, $R^{122}$, $R^{124}$, and $R^{125}$ in general formula (12) each preferably represent, independently of one another, an alkyl group having a carbon number of at least 1 and no greater than 8. Preferably, one of $e_1$ and $e_2$ represents 2 and the other of $e_1$ and $e_2$ represents 0. Preferably, one of $e_4$ and $e_5$ represents 2 and the other of $e_4$ and $e_5$ represents 0. Preferably, $e_3$ and $e_6$ each represent 0.

Preferable examples of the compound (12) include compounds represented by chemical formulas (HTM-8) and (HTM-9). In the following description, a compound represented by chemical formula (HTM-8) and a compound represented by chemical formula (HTM-9) may be referred to as a compound (HTM-8) and a compound (HTM-9), respectively.

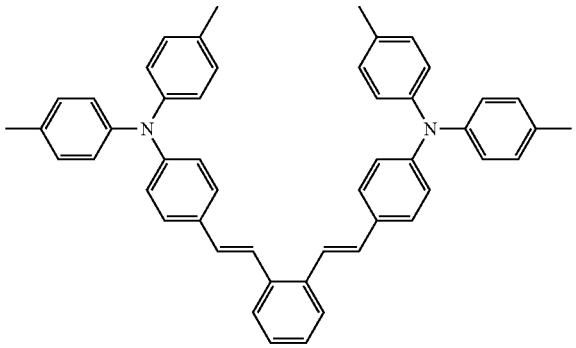

(HTM-8)

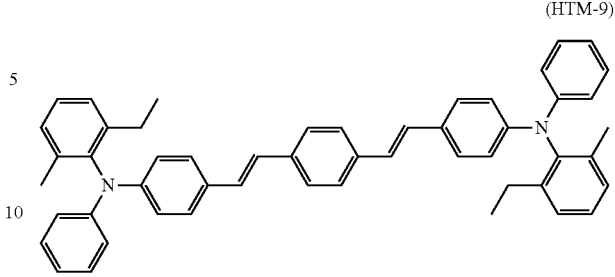

(HTM-9)

Among the compounds (10), (11), and (12), the compounds (10) and (12) are preferable for further improving filming resistance of the photosensitive member. Among the compounds (10), (11), and (12), the compounds (10) and (11) are preferable for improving abrasion resistance and sensitivity characteristics of the photosensitive member in addition to filming resistance thereof.

Among the compounds (HTM-1) to (HTM-9), the compounds (HTM-2), (HTM-3), and (HTM-8) are preferable for further improving filming resistance of the photosensitive member, and the compound (HTM-8) is more preferable. Among the compounds (HTM-1) to (HTM-9), the compounds (HTM-1), (HTM-3), (HTM-5), (HTM-6), and (HTM-7) are preferable for improving abrasion resistance of the photosensitive member in addition to filming resistance thereof, and the compounds (HTM-3), (HTM-5), and (HTM-7) are more preferable. Among the compounds (HTM-1) to (HTM-9), the compounds (HTM-4), (HTM-5), and (HTM-6) are preferable for improving sensitivity characteristics of the photosensitive member in addition to filming resistance thereof, and the compound (HTM-4) is more preferable.

The photosensitive layer may contain only the compound (10), (11), or (12) as the hole transport material. In a configuration in which the hole transport material includes the compound (10), (11), or (12), the photosensitive layer may further contain another hole transport material other than the compound (10), (11), or (12). The compound (10), (11), or (12) is contained in an amount of preferably at least 80% by mass relative to a total mass of the hole transport material(s), more preferably at least 90% by mass, and particularly preferably 100% by mass.

Note that a compound represented by chemical formula (HTM-10) (hereinafter may be referred to as a compound (HTM-10)) can also be used as the hole transport material.

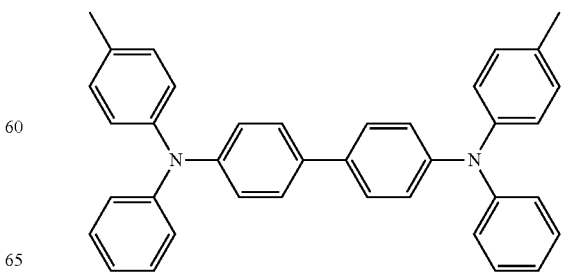

(HTM-10)

In a configuration in which the photosensitive member is a multi-layer photosensitive member, the hole transport material is contained in an amount of preferably at least 10 parts by mass and no greater than 200 parts by mass relative to 100 parts by mass of the binder resin contained in the charge transport layer, and more preferably at least 20 parts by mass and no greater than 100 parts by mass.

In a configuration in which the photosensitive member is a single-layer photosensitive member, the hole transport material is contained in the single-layer photosensitive layer in an amount of preferably at least 10 parts by mass and no greater than 200 parts by mass relative to 100 parts by mass of the binder resin contained in the single-layer photosensitive layer, and more preferably at least 10 parts by mass and no greater than 100 parts by mass.

(Charge Generating Material)

Examples of the charge generating material include phthalocyanine-based pigment, perylene-based pigment, bisazo pigment, tris-azo pigment, dithioketopyrrolopyrrole pigment, metal-free naphthalocyanine pigment, metal naphthalocyanine pigment, squaraine pigment, indigo pigment, azulenium pigment, cyanine pigment, powders of inorganic photoconductive materials (specific examples include selenium, selenium-tellurium, selenium-arsenic, cadmium sulfide, and amorphous silicon), pyrylium pigment, anthanthrone-based pigment, triphenylmethane-based pigment, threne-based pigment, toluidine-based pigment, pyrazoline-based pigment, and quinacridon-based pigment. One charge generating material may be used alone or two or more charge generating materials may be used in combination.

Examples of the phthalocyanine-based pigment include metal-free phthalocyanine and metal phthalocyanine. Examples of the metal phthalocyanine include titanyl phthalocyanine, hydroxygallium phthalocyanine, and chlorogallium phthalocyanine. The metal-free phthalocyanine is represented by chemical formula (CGM-1). Titanyl phthalocyanine is represented by chemical formula (CGM-2).

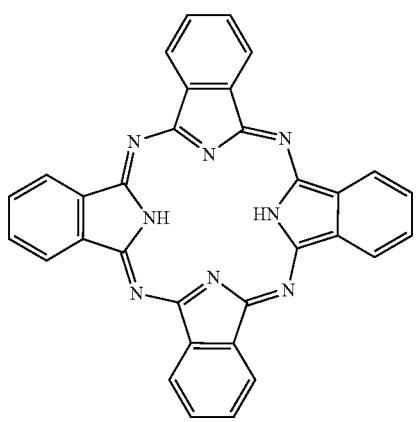

(CGM-1)

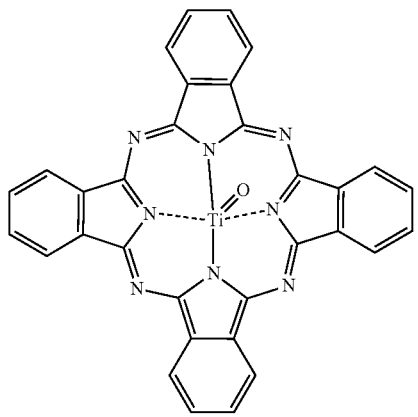

(CGM-2)

The phthalocyanine-based pigment may be crystalline or non-crystalline. An example of crystalline metal-free phthalocyanine is metal-free phthalocyanine having an X-form crystal structure (hereinafter may be referred to as X-form metal-free phthalocyanine). Examples of crystalline titanyl phthalocyanine include titanyl phthalocyanines having α-form, β-form, and Y-form crystal structures (hereinafter may be referred to below as α-form titanyl phthalocyanine, β-form titanyl phthalocyanine, and Y-form titanyl phthalocyanine, respectively).

A photosensitive member having sensitivity in a wavelength range of 700 nm or longer is preferably used for image forming apparatuses employing, for example, a digital optical system (for example, a laser beam printer or a facsimile machine using a light source such as a semiconductor laser). As the charge generating material, the phthalocyanine-based pigment is preferable in terms of their high quantum yield in a wavelength range of 700 nm or longer. The metal-free phthalocyanine and titanyl phthalocyanine are more preferable. The X-form metal-free phthalocyanine and the Y-form titanyl phthalocyanine are further preferable. The Y-form titanyl phthalocyanine is particularly preferable.

The anthanthrone-based pigment is favorably used as the charge generating material for a photosensitive member used in image forming apparatuses employing a short-wavelength laser light source (for example, a laser light source having a wavelength of at least 350 nm and no greater than 550 nm).

The charge generating material is contained in an amount of preferably at least 0.1 parts by mass and no greater than 50 parts by mass relative to 100 parts by mass of the binder resin contained in the photosensitive layer, more preferably at least 0.5 parts by mass and no greater than 30 parts by mass, and particularly preferably at least 0.5 parts by mass and no greater than 4.5 parts by mass.

(Additive)

Examples of additive include antidegradants (specific examples include antioxidant, radical scavenger, singlet quencher, and ultraviolet absorbing agent), softener, surface modifier, extender, thickener, dispersion stabilizer, wax, acceptor (specific examples include electron acceptor), donor, surfactant, plasticizer, sensitizer, and leveling agent. Examples of the antioxidant include hindered phenols (specific examples include di(tert-butyl)p-cresol), hindered amine, paraphenylenediamine, arylalkane, hydroquinone, spirochromane, spiroindanone, and derivatives thereof.

Examples of the antioxidant also include organosulfur compounds and organophosphorus compounds. An example of the leveling agent is dimethyl silicone oil. An example of the sensitizer is meta-terphenyl.

(Combination of Materials)

It is preferable to employ any of the following combinations of the binder resin and the hole transport material. It is more preferable to employ any of the following combinations of the binder resin and the hole transport material and use the Y-form titanyl phthalocyanine as the charge generating material. It is further preferable to employ any of the following combinations of the binder resin and the hole transport material, use the Y-form titanyl phthalocyanine as the charge generating material and use dimethyl silicone oil and meta-terphenyl as additives. Note that polyarylate resins (R-1-M1), (R-2-M1), (R-3-M1), (R-4-M1), (R-5-M1), (R-6-M1), (R-7-M1), (R-8-M1), (R-9-M1), (R-10-M1), (R-1-M2), (R-1-M3), and (R-1-M4) will be described later in Examples.

The binder resin is the polyarylate resin (R-1-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-2-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-3-M1) and hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-4-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-5-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-6-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-7-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-8-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-9-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-10-M1) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-1-M2) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-1-M3) and the hole transport material is any of the compounds (HTM-1), (HTM-2), (HTM-3), (HTM-4), (HTM-5), (HTM-6), (HTM-7), (HTM-8), (HTM-9), and (HTM-10).

The binder resin is the polyarylate resin (R-1-M4) and the hole transport material is any of the compounds (HTM-1), (HTM-2), (HTM-3), (HTM-4), (HTM-5), (HTM-6), (HTM-7), (HTM-8), (HTM-9), and (HTM-10).

(Conductive Substrate)

No particular limitation is placed on the conductive substrate as long as the conductive substrate can be used in the photosensitive member. It is only required that at least a surface portion of the conductive substrate is formed from an electrically conductive material. An example of the conductive substrate is formed from an electrically conductive material. Another example of the conductive substrate is coated with an electrically conductive material. Examples of the electrically conductive material include aluminum, iron, copper, tin, platinum, silver, vanadium, molybdenum, chromium, cadmium, titanium, nickel, palladium, indium, stainless steel, and brass. One of the above-listed electrically conductive materials may be used alone or two or more of the above-listed electrically conductive materials may be used in combination (for example, as an alloy). Among the above-listed electrically conductive materials, aluminum and an aluminum alloy are preferable in terms of favorable charge mobility from the photosensitive layer to the conductive substrate.

The shape of the conductive substrate is appropriately selected according to structure of an image forming apparatus. Examples of the shape of the conductive substrate include a sheet shape and a drum shape. Also, the thickness of the conductive substrate is appropriately selected according to the shape of the conductive substrate.

(Intermediate Layer)

The intermediate layer (undercoat layer) contains for example inorganic particles and a resin used for the intermediate layer (intermediate layer resin). It is thought that presence of the intermediate layer enables smooth flow of an electric current generated by exposure of the photosensitive member to light while maintaining insulation sufficient to prevent occurrence of leakage current, resulting in suppression of an increase in resistance.

Examples of the inorganic particles include particles of metals (specific examples include aluminum, iron, and copper), particles of metal oxides (specific examples include titanium oxide, alumina, zirconium oxide, tin oxide, and zinc oxide), and particles of non-metal oxides (specific examples include silica). One type of the above-listed inorganic particles may be used alone or two or more types of the above-listed inorganic particles may be used in combination.

Examples of the intermediate layer resin are the same as the above-listed examples of the other binder resin. In order to form the intermediate layer and the photosensitive layer favorably, it is preferable that the intermediate layer resin differs from the binder resin contained in the photosensitive layer. The intermediate layer may contain an additive. Examples of the additive contained in the intermediate layer are the same as the examples of the additive contained in the photosensitive layer.

(Method for Producing Photosensitive Member)

The following describes an example of methods for producing a multi-layer photosensitive member and an example of methods for producing a single-layer photosensitive member, as examples of methods for producing a photosensitive member.

(Method for Producing Multi-Layer Photosensitive Member)

Forming a photosensitive layer in a method for producing a multi-layer photosensitive member includes forming a charge generating layer and forming a charge transport layer. In the forming a charge generating layer, an application liquid for forming a charge generating layer (hereinafter may be referred to as an application liquid for charge generating layer formation) is initially prepared. The application liquid for charge generating layer formation is applied onto a conductive substrate. Next, at least a portion of a solvent contained in the applied application liquid for charge generating layer formation is removed to form a charge generating layer. The application liquid for charge generating layer formation contains for example a charge generating material, a base resin, and the solvent. The application liquid for charge generating layer formation is prepared by dissolving or dispersing the charge generating material and the base resin in the solvent. An additive may be added to the application liquid for charge generating layer formation as necessary.

In the forming a charge transport layer, an application liquid for forming a charge transport layer (hereinafter may be referred to as an application liquid for charge transport layer formation) is initially prepared. The application liquid for charge transport layer formation is applied onto the charge generating layer. Next, at least a portion of a solvent contained in the applied application liquid for charge transport layer formation is removed to form a charge transport layer. The application liquid for charge transport layer formation contains a hole transport material, the polyarylate resin (PA) as a binder resin, and the solvent. The application liquid for charge transport layer formation can be prepared by dissolving or dispersing the hole transport material and the polyarylate resin (PA) in the solvent. An additive may be added to the application liquid for charge transport layer formation as necessary.

(Method for Producing Single-Layer Photosensitive Member)

In forming a photosensitive layer in a method for producing a single-layer photosensitive member, an application liquid for forming a single-layer photosensitive layer (hereinafter may be referred to as an application liquid for single-layer photosensitive layer formation) is prepared. The application liquid for single-layer photosensitive layer formation is applied onto a conductive substrate. Next, at least a portion of a solvent contained in the applied application liquid for single-layer photosensitive layer formation is removed to form a single-layer photosensitive layer. The application liquid for single-layer photosensitive layer formation contains for example a charge generating material, a hole transport material, the polyarylate resin (PA) as a binder resin, and the solvent. The application liquid for single-layer photosensitive layer formation is prepared by dissolving or dispersing the charge generating material, the hole transport material, and the polyarylate resin (PA) as the binder resin in the solvent. An additive may be added to the application liquid for single-layer photosensitive layer formation as necessary.

No particular limitation is placed on the respective solvents contained in the application liquid for charge generating layer formation, the application liquid for charge transport layer formation, and the application liquid for single-layer photosensitive layer formation (hereinafter may each be referred to as an application liquid) as long as components contained in the respective application liquids can be dissolved or dispersed in the respective application liquids. Examples of the solvents include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include dichloromethane, dichloroethane, carbon tetrachloride, and chlorobenzene), ethers (specific examples include dimethyl ether, diethyl ether, tetrahydrofuran, ethylene glycol dimethyl ether, and diethylene glycol dimethyl ether), ketones (specific examples include acetone, methyl ethyl ketone, and cyclohexanone), esters (specific examples include ethyl acetate and methyl acetate), dimethyl formaldehyde, dimethyl formamide, and dimethyl sulfoxide. One of the above-listed solvents may be used alone or two or more of the above-listed solvents may be used in combination. Among the above-listed solvents, non-halogenated solvents (solvents other than the halogenated hydrocarbons) are preferably used.

It is preferable that the solvent contained in the application liquid for charge transport layer formation differs from the solvent contained in the application liquid for charge generating layer formation. This is because it is preferable that the charge generating layer does not dissolve in the solvent contained in the application liquid for charge transport layer formation when the application liquid for charge transport layer formation is applied onto the charge generating layer.

The application liquids are each prepared by mixing the respective components to disperse the components in the solvent. Mixing or dispersion may be performed using for example a bead mill, a roll mill, a ball mill, an attritor, a paint shaker, or an ultrasonic disperser.

In order to improve dispersibility of the components or surface smoothness of each layer to be formed, the application liquids may contain for example a surfactant or a leveling agent.

No particular limitation is placed on a method for applying each of the application liquids as long as the method can achieve uniform application of the application liquid. Examples of the method for applying include dip coating, spray coating, spin coating, and bar coating.

No particular limitation is placed on a method for removing at least a portion of the solvent contained in each of the application liquids as long as the method can achieve vaporization of the solvent contained in the application liquid. Examples of the method for removal include heating, depressurization, and a combination of heating and depressurization. More specific examples of the method for removal include thermal treatment (hot-air drying) using a high-temperature dryer or a reduced pressure dryer. The thermal treatment is performed for example at a temperature of at least 40° C. and no higher than 150° C. for a time of at least three minutes and no longer than 120 minutes.

Note that the method for producing a photosensitive member may further include forming an intermediate layer as necessary. A known process can be appropriately employed in the forming an intermediate layer.

When the polyarylate resin (PA) of the present embodiment described above is contained in the photosensitive layer, occurrence of filming on the photosensitive member can be prevented. Also, occurrence of filming can be prevented through use of the photosensitive member that includes the photosensitive layer containing the polyarylate resin (PA) of the present embodiment.

EXAMPLES

The following describes the present disclosure more specifically using examples. However, the present disclosure is by no means limited to the scope of the examples.

A charge generating material described below was prepared as a material for forming charge generating layers of photosensitive members. Also, hole transport materials and binder resins described below were prepared as materials for forming charge transport layers of the photosensitive members.

(Charge Generating Material)

The Y-form titanyl phthalocyanine represented by chemical formula (CGM-2) described above in the embodiment was prepared as the charge generating material.

(Hole Transport Material)

The compounds (HTM-1) to (HTM-10) described above in the embodiment were prepared as the hole transport materials.

(Binder Resin)

The polyarylate resins (R-1-M1) to (R-1-M4) and (R-2-M1) to (R-10-M1) were prepared as the binder resins by the following respective methods. Note that a percentage yield was obtained in terms of molar ratio for each of the polyarylate resins.

[Polyarylate Resin (R-1-M1)]

The polyarylate resin (R-1-M1) included the terminal group (M1). The polyarylate resin (R-1-M1) included only the repeating units (1-1), (2-1C), and (2-2A) as repeating units. The polyarylate resin (R-1-M1) included the two types of repeating units (2-1C) and (2-2A) as the repeating units (2), and the ratio p and the ratio q were each 0.50. Note that the polyarylate resin (R-1-M1) included only the one type of repeating unit (1-1) as the repeating unit (1). Therefore, the ratio r and the ratio s were not specified. The polyarylate resin (R-1-M1) had a viscosity average molecular weight of 50,500.

(R-1-M1)

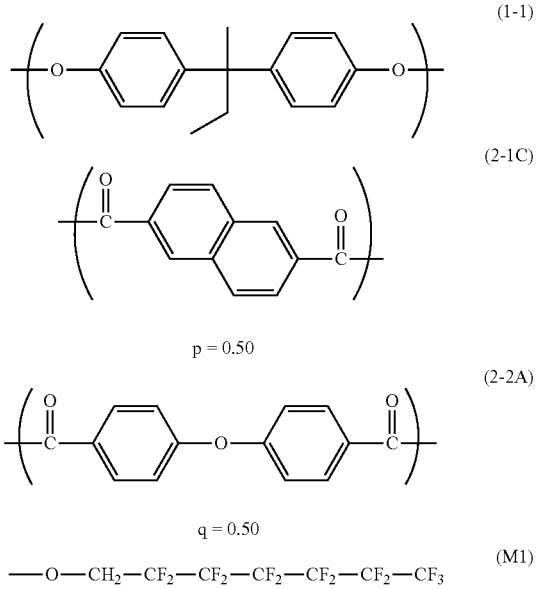

In preparation of the polyarylate resin (R-1-M1), a 2-L three-necked flask equipped with a thermometer and a three-way cock was used as a reaction vessel. The reaction vessel was charged with 20.01 g (82.56 mmol) of the compound (BP-1-1), 0.281 g (0.826 mmol) of the compound (T-M1), 7.84 g (196 mmol) of sodium hydroxide, and 0.240 g (0.768 mmol) of benzyltributylammonium chloride. Air in the reaction vessel was replaced by an argon gas. Then, 600 mL of water was added to the contents of the reaction vessel.

The contents of the reaction vessel were stirred for one hour at 20° C. Then, the contents of the reaction vessel were cooled to 10° C. Through the above, an alkaline aqueous solution A was obtained.

Also, 9.84 g (38.9 mmol) of 2,6-naphthalenedicarboxylic acid dichloride (dichloride of the compound (DC-2-1C)) and 11.47 g (38.9 mmol) of 4,4'-oxybisbenzoic acid dichloride (dichloride of the compound (DC-2-2A)) were dissolved in 300 g of chloroform. Through the above, a chloroform solution B was obtained.

The chloroform solution B was added to the alkaline aqueous solution A in the reaction vessel while the alkaline aqueous solution A was stirred at 10° C. Through the above, a polymerization reaction was caused to take place. The contents of the reaction vessel were stirred for three hours while the temperature (solution temperature) of the contents of the reaction vessel was adjusted to 13±3° C. to cause the polymerization reaction to proceed. Then, an upper layer (water phase) of the contents of the reaction vessel was removed through decanting to obtain an organic phase. Then, a 2-L conical flask was charged with 500 mL of ion exchanged water. The obtained organic phase was added to the flask content. Further, 300 g of chloroform and 6 mL of acetic acid were added to the flask contents. Then, the flask contents were stirred for 30 minutes at room temperature. Thereafter, an upper layer (water phase) of the flask contents was removed through decanting to obtain an organic phase. The obtained organic phase was washed with 500 mL of ion exchanged water using a separatory funnel. The washing with the ion exchanged water was repeated eight times. Through the above, an organic phase washed with water was obtained.

The organic phase washed with water was filtered to obtain a filtrate. A 3-L beaker was charged with 1.5 L of methanol. The obtained filtrate was dripped gradually into the methanol in the beaker to obtain a sediment. The sediment was collected by filtration. The collected sediment was dried in vacuum for 12 hours at a temperature of 70° C. Through the above, the polyarylate resin (R-1-M1) was obtained. The polyarylate resin (R-1-M1) had a mass yield of 28.6 g and a percentage yield of 82.9%.

[Polyarylate Resin (R-2-M1)]

The polyarylate resin (R-2-M1) included the terminal group (M1). The polyarylate resin (R-2-M1) included only the repeating units (1-1), (2-1C), and (2-2B) as repeating units. The polyarylate resin (R-2-M1) included the two types of repeating units (2-1C) and (2-2B) as the repeating units (2), and the ratio p and the ratio q were each 0.50. Note that the polyarylate resin (R-2-M1) included only the one type of repeating unit (1-1) as the repeating unit (1). Therefore, the ratio r and the ratio s were not specified. The polyarylate resin (R-2-M1) had a viscosity average molecular weight of 52,200.

(R-2-M1)

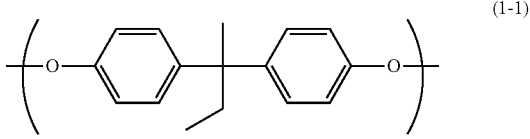

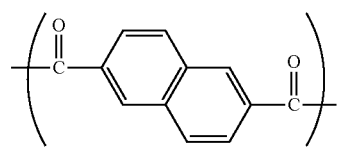

(2-1C)

p = 0.50

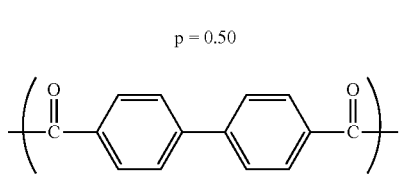

(2-2B)

q = 0.50

—O—CH$_2$—CF$_2$—CF$_2$—CF$_2$—CF$_2$—CF$_2$—CF$_3$ (M1)

The polyarylate resin (R-2-M1) was prepared in the same manner as the polyarylate resin (R-1-M1) in all aspects other than that 38.9 mmol of dichloride of the compound (DC-2-2B) was used instead of 38.9 mmol of the dichloride of the compound (DC-2-2A). The polyarylate resin (R-2-M1) had a mass yield of 27.8 g and a percentage yield of 82.1%.

[Polyarylate Resin (R-3-M1)]

The polyarylate resin (R-3-M1) included the terminal group (M1). The polyarylate resin (R-3-M1) included only the repeating units (1-2), (2-1C), and (2-2A) as repeating units. The polyarylate resin (R-3-M1) included the two types of repeating units (2-1C) and (2-2A) as the repeating units (2). The ratio p and the ratio q were each 0.50. Note that the polyarylate resin (R-3-M1) included only the one type of repeating unit (1-2) as the repeating unit (1). Therefore, the ratio r and the ratio s were not specified. The polyarylate resin (R-3-M1) had a viscosity average molecular weight of 48,100.

(R-3-M1)

(1-2)

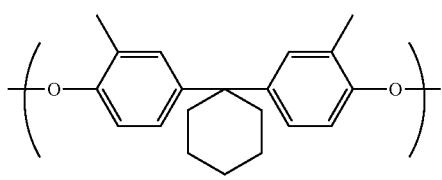

(2-1C)

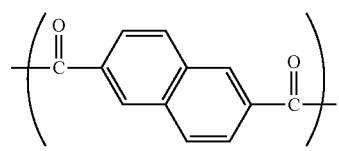

p = 0.50

(2-2A)

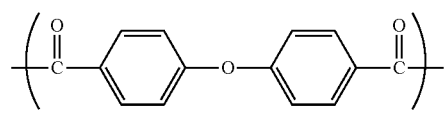

q = 0.50

—O—CH$_2$—CF$_2$—CF$_2$—CF$_2$—CF$_2$—CF$_2$—CF$_3$ (M1)

The polyarylate resin (R-3-M1) was prepared in the same manner as the polyarylate resin (R-1-M1) in all aspects other than that 82.56 mmol of the compound (BP-1-2) was used instead of 82.56 mmol of the compound (BP-1-1). The polyarylate resin (R-3-M1) had a mass yield of 31.0 g and a percentage yield of 80.1%.

[Polyarylate Resin (R-4-M1)]

The polyarylate resin (R-4-M1) included the terminal group (M1). The polyarylate resin (R-4-M1) included only the repeating units (1-2), (2-1C), and (2-2A) as repeating units. The polyarylate resin (R-4-M1) included the two types of repeating units (2-1C) and (2-2A) as the repeating units (2). The ratio p was 0.30 and the ratio q was 0.70. Note that the polyarylate resin (R-4-M1) included only the one type of repeating unit (1-2) as the repeating unit (1). Therefore, the ratio r and the ratio s were not specified. The polyarylate resin (R-4-M1) had a viscosity average molecular weight of 47,600.

(R-4-M1)

(1-2)

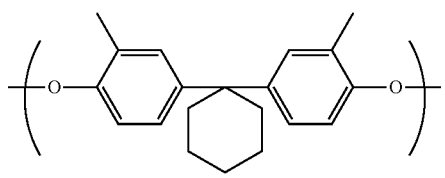

(2-1C)

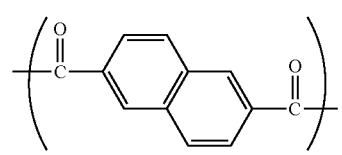

p = 0.30

(2-2A)

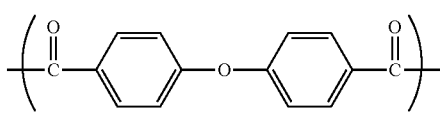

q = 0.70

—O—CH$_2$—CF$_2$—CF$_2$—CF$_2$—CF$_2$—CF$_2$—CF$_3$ (M1)

The polyarylate resin (R-4-M1) was prepared in the same manner as the polyarylate resin (R-1-M1) in all aspects other than the following changes. Specifically, 82.56 mmol of the compound (BP-1-2) was used instead of 82.56 mmol of the compound (BP-1-1). Also, 23.3 mmol of the dichloride of the compound (DC-2-1C) and 54.5 mmol of the dichloride of the compound (DC-2-2A) were used instead of 38.9 mmol of the dichloride of the compound (DC-2-1C) and 38.9 mmol of the dichloride of the compound (DC-2-2A). The polyarylate resin (R-4-M1) had a mass yield of 31.3 g and a percentage yield of 79.6%.

[Polyarylate Resin (R-5-M1)]

The polyarylate resin (R-5-M1) included the terminal group (M1). The polyarylate resin (R-5-M1) included only the repeating units (1-2), (1-3), (2-1C), and (2-2A) as repeating units. The polyarylate resin (R-5-M1) included the two types of repeating units (2-1C) and (2-2A) as the repeating units (2). The ratio p was 0.10 and the ratio q was 0.90. The polyarylate resin (R-5-M1) included the two types of repeating units (1-2) and (1-3) as the repeating units (1). The ratio r was 0.10 and the ratio s was 0.90. The polyarylate resin (R-5-M1) had a viscosity average molecular weight of 49,500.

(R-5-M1)

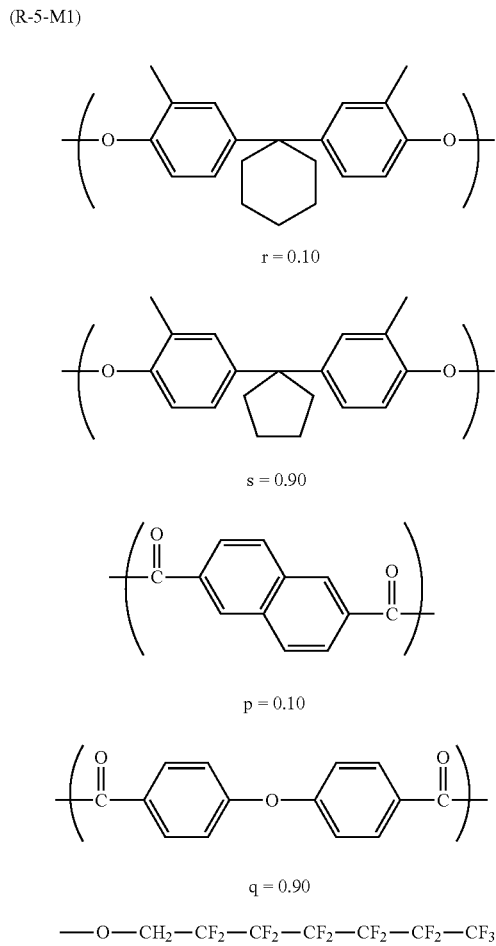

The polyarylate resin (R-5-M1) was prepared in the same manner as the polyarylate resin (R-1-M1) in all aspects other than the following changes. Specifically, 8.26 mmol of the compound (BP-1-2) and 74.30 mmol of the compound (BP-1-3) were used instead of 82.56 mmol of the compound (BP-1-1). Also, 7.8 mmol of the dichloride of the compound (DC-2-1C) and 70.0 mmol of the dichloride of the compound (DC-2-2A) were used instead of 38.9 mmol of the dichloride of the compound (DC-2-1C) and 38.9 mmol of the dichloride of the compound (DC-2-2A). The polyarylate resin (R-5-M1) had a mass yield of 31.2 g and a percentage yield of 80.0%.

[Polyarylate Resin (R-6-M1)]

The polyarylate resin (R-6-M1) included the terminal group (M1). The polyarylate resin (R-6-M1) included only the repeating units (1-2), (2-1C), and (2-2B) as repeating units. The polyarylate resin (R-6-M1) included the two types of repeating units (2-1C) and (2-2B) as the repeating units (2). The ratio p and the ratio q were each 0.50. Note that the polyarylate resin (R-6-M1) included only the one type of repeating unit (1-2) as the repeating unit (1). Therefore, the ratio r and the ratio s were not specified. The polyarylate resin (R-6-M1) had a viscosity average molecular weight of 48,900.

(R-6-M1)

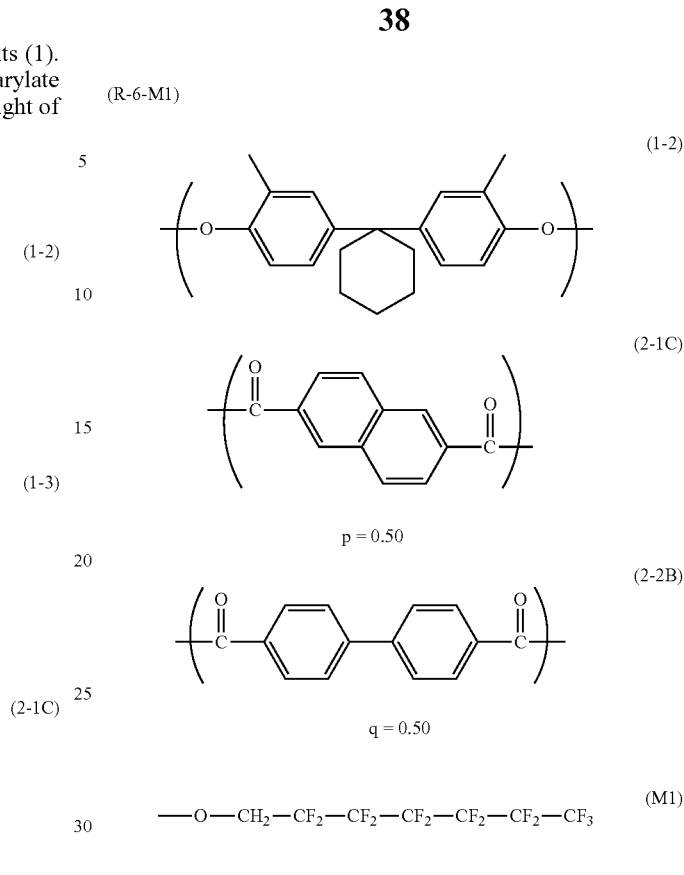

The polyarylate resin (R-6-M1) was prepared in the same manner as the polyarylate resin (R-1-M1) in all aspects other than the following changes. Specifically, 82.56 mmol of the compound (BP-1-2) was used instead of 82.56 mmol of the compound (BP-1-1). Also, 38.9 mmol of dichloride of the compound (DC-2-2B) was used instead of 38.9 mmol of the dichloride of the compound (DC-2-2A). The polyarylate resin (R-6-M1) had a mass yield of 30.5 g and a percentage yield of 76.8%.

[Polyarylate Resin (R-7-M1)]

The polyarylate resin (R-7-M1) included the terminal group (M1). The polyarylate resin (R-7-M1) included only the repeating units (1-2), (2-1C), and (2-2D) as repeating units. The polyarylate resin (R-7-M1) included the two types of repeating units (2-1C) and (2-2D) as the repeating units (2). The ratio p and the ratio q were each 0.50. Note that the polyarylate resin (R-7-M1) included only the one type of repeating unit (1-2) as the repeating unit (1). Therefore, the ratio r and the ratio s were not specified. The polyarylate resin (R-7-M1) had a viscosity average molecular weight of 47,600.

(R-7-M1)

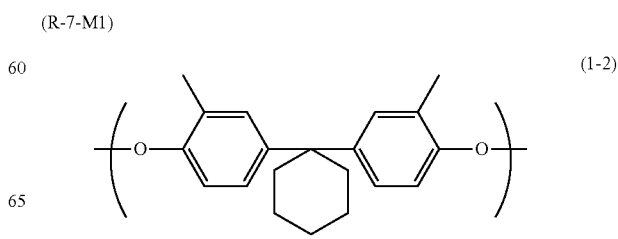

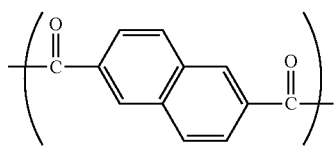

(2-1C)

p = 0.50

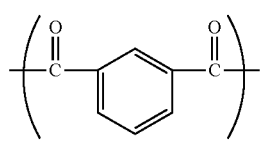

(2-2D)

q = 0.50

—O—CH$_2$—CF$_2$—CF$_2$—CF$_2$—CF$_2$—CF$_2$—CF$_3$ (M1)

The polyarylate resin (R-7-M1) was prepared in the same manner as the polyarylate resin (R-1-M1) in all aspects other than the following changes. Specifically, 82.56 mmol of the compound (BP-1-2) was used instead of 82.56 mmol of the compound (BP-1-1). Also, 38.9 mmol of dichloride of the compound (DC-2-2D) was used instead of 38.9 mmol of the dichloride of the compound (DC-2-2A). The polyarylate resin (R-7-M1) had a mass yield of 28.9 g and a percentage yield of 78.6%.

[Polyarylate Resin (R-8-M1)]

The polyarylate resin (R-8-M1) included the terminal group (M1). The polyarylate resin (R-8-M1) included only the repeating units (1-4), (2-1C), and (2-2A) as repeating units. The polyarylate resin (R-8-M1) included the two types of repeating units (2-1C) and (2-2A) as the repeating units (2). The ratio p and the ratio q were each 0.50. Note that the polyarylate resin (R-8-M1) included only the one type of repeating unit (1-4) as the repeating unit (1). Therefore, the ratio r and the ratio s were not specified. The polyarylate resin (R-8-M1) had a viscosity average molecular weight of 55,100.

(R-8-M1)

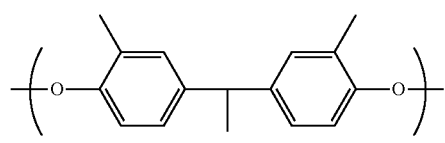

(1-4)

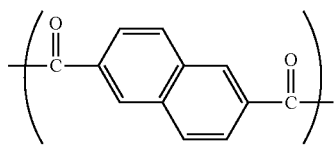

(2-1C)

p = 0.50

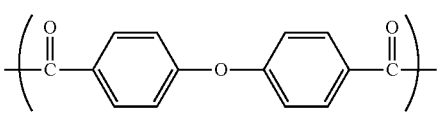

(2-2A)

q = 0.50

—O—CH$_2$—CF$_2$—CF$_2$—CF$_2$—CF$_2$—CF$_2$—CF$_3$ (M1)

The polyarylate resin (R-8-M1) was prepared in the same manner as the polyarylate resin (R-1-M1) in all aspects other than that 82.56 mmol of the compound (BP-1-4) was used instead of 82.56 mmol of the compound (BP-1-1). The polyarylate resin (R-8-M1) had a mass yield of 27.8 g and a percentage yield of 80.6%.

[Polyarylate Resin (R-9-M1)]

The polyarylate resin (R-9-M1) included the terminal group (M1). The polyarylate resin (R-9-M1) included only the repeating units (1-1) and (2-2A) as repeating units. Note that the polyarylate resin (R-9-M1) included only the one type of repeating unit (2-2A) as the repeating unit (2). Therefore, the ratio p and the ratio q were not specified. Also, the polyarylate resin (R-9-M1) included only the one type of repeating unit (1-1) as the repeating unit (1). Therefore, the ratio r and the ratio s were not specified. The polyarylate resin (R-9-M1) had a viscosity average molecular weight of 60,000.

(R-9-M1)

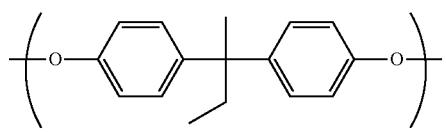

(1-1)

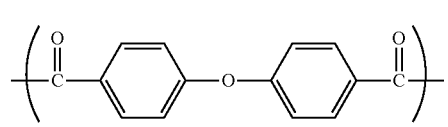

(2-2A)

—O—CH$_2$—CF$_2$—CF$_2$—CF$_2$—CF$_2$—CF$_2$—CF$_3$ (M1)

The polyarylate resin (R-9-M1) was prepared in the same manner as the polyarylate resin (R-1-M1) in all aspects other than the following changes. Specifically, 77.8 mmol of the dichloride of the compound (DC-2-2A) was used instead of 38.9 mmol of the dichloride of the compound (DC-2-1C) and 38.9 mmol of the dichloride of the compound (DC-2-2A). The polyarylate resin (R-9-M1) had a mass yield of 28.8 g and a percentage yield of 79.7%.

[Polyarylate Resin (R-10-M1)]

The polyarylate resin (R-10-M1) included the terminal group (M1). The polyarylate resin (R-10-M1) included only the repeating units (1-2), (2-1C), and (2-2A) as repeating units. The polyarylate resin (R-10-M1) included the two types of repeating units (2-1C) and (2-2A) as the repeating units (2). The ratio p was 0.70 and the ratio q was 0.30. Note that the polyarylate resin (R-10-M1) included only the one type of repeating unit (1-2) as the repeating unit (1). Therefore, the ratio r and the ratio s were not specified. The polyarylate resin (R-10-M1) had a viscosity average molecular weight of 49,700.

(R-10-M1)

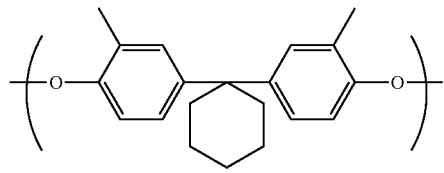
(1-2)

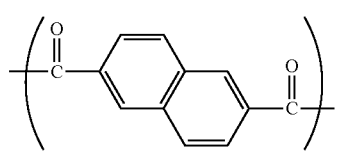
(2-1C)

p = 0.70

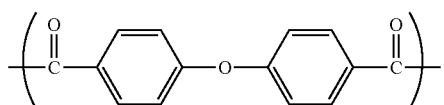
(2-2A)

q = 0.30

—O—CH$_2$—CF$_2$—CF$_2$—CF$_2$—CF$_2$—CF$_2$—CF$_3$ (M1)

The polyarylate resin (R-10-M1) was prepared in the same manner as the polyarylate resin (R-1-M1) in all aspects other than the following changes. Specifically, 82.56 mmol of the compound (BP-1-2) was used instead of 82.56 mmol of the compound (BP-1-1). Also, 54.5 mmol of the dichloride of the compound (DC-2-1C) and 23.3 mmol of the dichloride of the compound (DC-2-2A) were used instead of 38.9 mmol of the dichloride of the compound (DC-2-1C) and 38.9 mmol of the dichloride of the compound (DC-2-2A). The polyarylate resin (R-10-M1) had a mass yield of 30.0 g and a percentage yield of 78.9%.

[Polyarylate Resin (R-1-M2)]

The polyarylate resin (R-1-M2) included the terminal group (M2). The polyarylate resin (R-1-M2) included only the repeating units (1-1), (2-1C), and (2-2A) as repeating units. The polyarylate resin (R-1-M2) included the two types of repeating units (2-1C) and (2-2A) as the repeating units (2). The ratio p and the ratio q were each 0.50. Note that the polyarylate resin (R-1-M2) included only the one type of repeating unit (1-1) as the repeating unit (1). Therefore, the ratio r and the ratio s were not specified. The polyarylate resin (R-1-M2) had a viscosity average molecular weight of 53,500.

(R-1-M2)

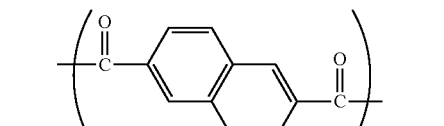
(1-1)

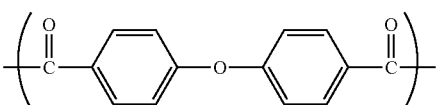
(2-1C)

p = 0.50

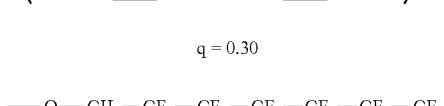
(2-2A)

q = 0.50

—O—CH$_2$—CF—O—CF$_2$—CF$_2$—CF$_3$ (M2)
            |
           CF$_3$

The polyarylate resin (R-1-M2) was prepared in the same manner as the polyarylate resin (R-1-M1) in all aspects other than that 0.826 mmol of the compound (T-M2) was used instead of 0.826 mmol of the compound (T-M1). The polyarylate resin (R-1-M2) had a mass yield of 27.5 g and a percentage yield of 79.7%.

[Polyarylate Resin (R-1-M3)]

The polyarylate resin (R-1-M3) included the terminal group (M3). The polyarylate resin (R-1-M3) included only the repeating units (1-1), (2-1C), and (2-2A) as repeating units. The polyarylate resin (R-1-M3) included the two types of repeating units (2-1C) and (2-2A) as the repeating units (2). The ratio p and the ratio q were each 0.50. Note that the polyarylate resin (R-1-M3) included only the one type of repeating unit (1-1) as the repeating unit (1). Therefore, the ratio r and the ratio s were not specified. The polyarylate resin (R-1-M3) had a viscosity average molecular weight of 56,100.

(R-1-M3)

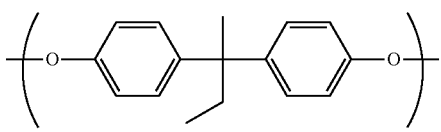
(1-1)

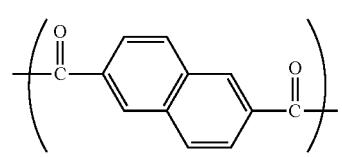
(2-1C)

p = 0.50

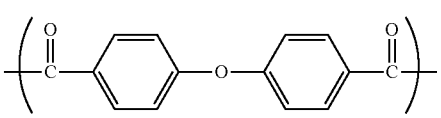
(2-2A)

q = 0.50

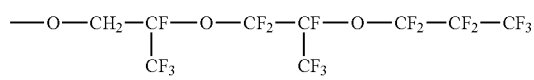
(M3)

The polyarylate resin (R-1-M3) was prepared in the same manner as the polyarylate resin (R-1-M1) in all aspects other than that 0.826 mmol of the compound (T-M3) was used instead of 0.826 mmol of the compound (T-M1). The polyarylate resin (R-1-M3) had a mass yield of 28.6 g and a percentage yield of 82.9%.

[Polyarylate Resin (R-1-M4)]

The polyarylate resin (R-1-M4) included the terminal group (M4). The polyarylate resin (R-1-M4) included only the repeating units (1-1), (2-1C), and (2-2A) as repeating units. The polyarylate resin (R-1-M4) included the two types of repeating units (2-1C) and (2-2A) as the repeating units (2), and the ratio p and the ratio q were each 0.50. Note that the polyarylate resin (R-1-M4) included only the one type of repeating unit (1-1) as the repeating unit (1). Therefore, the ratio r and the ratio s were not specified. The polyarylate resin (R-1-M4) had a viscosity average molecular weight of 54,200.

(R-1-M4)

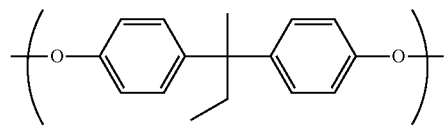
(1-1)

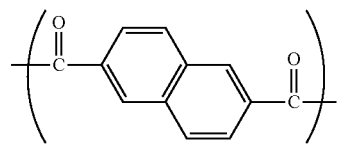
(2-1C)

p = 0.50

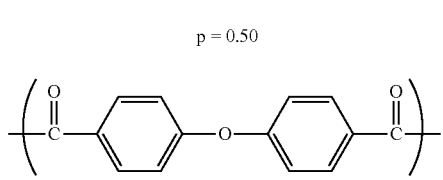
(2-2A)

q = 0.50

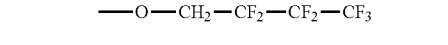
(M4)

The polyarylate resin (R-1-M4) was prepared in the same manner as the polyarylate resin (R-1-M1) in all aspects other than that 0.826 mmol of the compound (T-M4) was used instead of 0.826 mmol of the compound (T-M1). The polyarylate resin (R-1-M4) had a mass yield of 28.4 g and a percentage yield of 82.4%.

Next, the polyarylate resins (R-1-MA) and (R-1-MB) were prepared by the following respective manners as binder resins used in comparative examples. Note that a percentage yield was obtained in terms of molar ratio for each of the polyarylate resins.

[Polyarylate Resin (R-1-MA)]

The polyarylate resin (R-1-MA) included the terminal group (MA). The polyarylate resin (R-1-MA) included only the repeating units (1-1), (2-1C), and (2-2A) as repeating units. The polyarylate resin (R-1-MA) included the two types of repeating units (2-1C) and (2-2A) as the repeating units (2). The ratio p and the ratio q were each 0.50. Note that the polyarylate resin (R-1-MA) included only the one type of repeating unit (1-1) as the repeating unit (1). Therefore, the ratio r and the ratio s were not specified. The polyarylate resin (R-1-MA) had a viscosity average molecular weight of 58,100.

(R-1-MA)

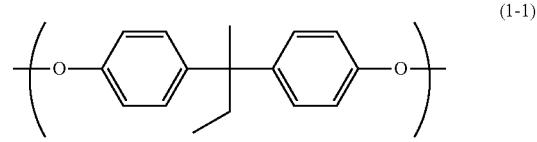
(1-1)

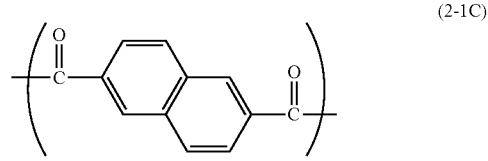
(2-1C)

p = 0.50

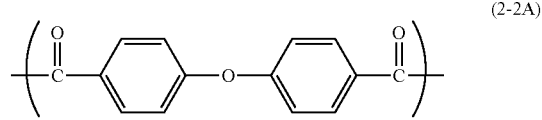
(2-2A)

q = 0.50

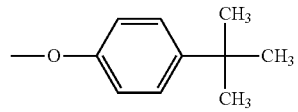
(MA)

The polyarylate resin (R-1-MA) was prepared in the same manner as the polyarylate resin (R-1-M1) in all aspects other than that 0.826 mmol of a compound (p-tert-butyl phenol) represented by the following chemical formula (T-MA) was used instead of 0.826 mmol of the compound (T-M1). The polyarylate resin (R-1-MA) had a mass yield of 29.0 g and a percentage yield of 84.1%.

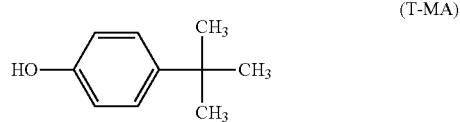
(T-MA)

[Polyarylate Resin (R-1-MB)]

The polyarylate resin (R-1-MB) included the terminal group (MB). The polyarylate resin (R-1-MB) included only the repeating units (1-1), (2-1C), and (2-2A) as repeating units. The polyarylate resin (R-1-MB) included the two types of repeating units (2-1C) and (2-2A) as the repeating units (2). The ratio p and the ratio q were each 0.50. Note that the polyarylate resin (R-1-MB) included only the one type of repeating unit (1-1) as the repeating unit (1). Therefore, the ratio r and the ratio s were not specified. The polyarylate resin (R-1-MB) had a viscosity average molecular weight of 59,500.

(R-1-MB)

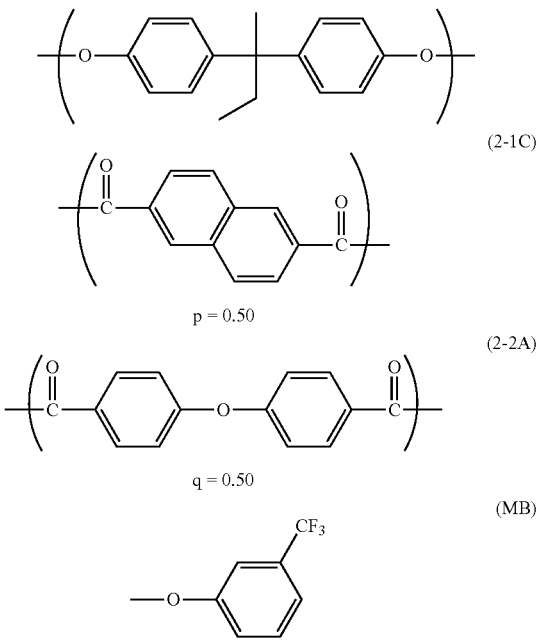

The polyarylate resin (R-1-MB) was prepared in the same manner as the polyarylate resin (R-1-M1) in all aspects other than that 0.826 mmol of a compound (3-trifluoromethyl phenol) represented by the following chemical formula (T-MB) was used instead of 0.826 mmol of the compound (T-M1). The polyarylate resin (R-1-MB) had a mass yield of 27.6 g and a percentage yield of 80.0%.

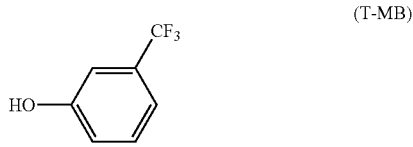 [SMILES: Oc1cccc(C(F)(F)F)c1]

(T-MB)

<Production of Multi-Layer Photosensitive Member>

Multi-layer photosensitive members (A-1) to (A-22) and (B-1) to (B-3) were produced using the above-described charge generating material, hole transport materials, and binder resins.

(Production of Multi-Layer Photosensitive Member (A-1))

First, an intermediate layer was formed. A surface-treated titanium oxide ("trial product SMT-A" produced by TAYCA CORPORATION, average primary particle diameter of 10 nm) was prepared. SMT-A was titanium oxide that had been surface-treated with alumina and silica, and further surface-treated with methyl hydrogen polysiloxane while being subjected to wet dispersion. Then, SMT-A (2 parts by mass) and a polyamide resin ("AMILAN (registered Japanese trademark) CM8000" produced by Toray Industries, Inc., a four-component copolymer polyamide resin of polyamide 6, polyamide 12, polyamide 66, and polyamide 610, 1 part by mass) were added to a solvent containing methanol (10 parts by mass), butanol (1 part by mass), and toluene (1 part by mass). These materials and the solvent were mixed for five hours using a bead mill to disperse the materials in the solvent. Through the above, an application liquid for intermediate layer formation was prepared. The application liquid for intermediate layer formation was filtered using a filter having openings of 5 μm. Thereafter, the application liquid for intermediate layer formation was applied onto a surface of a conductive substrate by dip coating. An aluminum drum-shaped support (diameter: 30 mm, entire length: 246 mm) was used as the conductive substrate. Subsequently, the applied application liquid for intermediate layer formation was dried at 130° C. for 30 minutes to form the intermediate layer (film thickness: 2 μm) on the conductive substrate.

Then, a charge generating layer was formed. Specifically, the Y-form titanyl phthalocyanine (1.5 parts by mass) and a polyvinyl acetal resin ("S-LEC BX-5" produced by Sekisui Chemical Co., Ltd., 1 part by mass) were added to a solvent containing propylene glycol monomethyl ether (40 parts by mass) and tetrahydrofuran (40 parts by mass). These materials and the solvent were mixed for two hours using a bead mill to disperse the materials in the solvent. Through the above, an application liquid for charge generating layer formation was prepared. The application liquid for charge generating layer formation was filtered using a filter having openings of 3 μm. The resultant filtrate was applied onto the intermediate layer by dip coating, and then dried at 50° C. for five minutes. Through the above, the charge generating layer (film thickness: 0.3 μm) was formed on the intermediate layer.

Then, a charge transport layer was formed. Specifically, 50 parts by mass of the compound (HTM-1) as a hole transport material, 5 parts by mass of meta-terphenyl, 100 parts by mass of the polyarylate resin (R-1-M1) as a binder resin, and 0.05 parts by mass of a leveling agent (dimethyl silicone oil, "KF96-50CS" produced by Shin-Etsu Chemical Co., Ltd.) were added to a solvent containing 600 parts by mass of tetrahydrofuran and 100 parts by mass of toluene. These materials and the solvent were mixed to disperse the materials in the solvent. Through the above, an application liquid for charge transport layer formation was prepared. The application liquid for charge transport layer formation was applied onto the charge generating layer by dip coating. The conductive substrate with the charge generating layer to which the application liquid for charge transport layer formation had been applied was put in an oven. The internal temperature of the oven was increased from 60° C. to 130° C. at a rate of 1° C./minute, and the conductive substrate was dried for 60 minutes at the internal temperature of the oven of 130° C. Through the above, the charge transport layer (film thickness: 20 μm) was formed on the charge generating layer. As a result, the multi-layer photosensitive member (A-1) was obtained. The multi-layer photosensitive member (A-1) included the intermediate layer located on the conductive substrate, the charge generating layer located on the intermediate layer, and the charge transport layer located on the charge generating layer.

(Production of Multi-Layer Photosensitive Members (A-2) to (A-22) and (B-1) to (B-3))

The multi-layer photosensitive members (A-2) to (A-22) and (B-1) to (B-3) were produced in the same manner as the multi-layer photosensitive member (A-1) in all aspects other than the following changes. Although the polyarylate resin (R-1-M1) was used as the binder resin in production of the multi-layer photosensitive member (A-1), respective binder resins indicated in Tables 1 to 4 were used in production of the multi-layer photosensitive members (A-2) to (A-22) and (B-1) to (B-3). Although the compound (HTM-1) was used as the hole transport material in production of the multi-layer photosensitive member (A-1), respective hole transport materials indicated in Tables 1 to 4 were used in production of the multi-layer photosensitive members (A-2) to (A-22) and (B-1) to (B-3).

<Evaluation of Abrasion Resistance>

Abrasion resistance was evaluated for each of the multi-layer photosensitive members (A-1) to (A-22) and (B-1) to (B-3). A color printer ("C711dn" produced by OKI Data Corporation) was used as an evaluation apparatus in evaluation of abrasion resistance. Cyan toner was loaded into a toner cartridge of the evaluation apparatus.

First, a film thickness $T_1$ of the charge transport layer of the multi-layer photosensitive member was measured. Then, the multi-layer photosensitive member was set in the evaluation apparatus. Next, an image I (a pattern image with a coverage rate of 1%) was printed on 10,000 sheets of paper using the evaluation apparatus in an environment of normal temperature and normal humidity (temperature: 23° C., relative humidity: 50%, hereinafter may be referred to as an NN environment). Then, the image I was printed on 10,000 sheets of paper using the evaluation apparatus in an environment of high temperature and high humidity (temperature: 32° C., relative humidity: 85%, hereinafter may be referred to as an HH environment). Then, the image I was printed on 10,000 sheets of paper using the evaluation apparatus in an environment of low temperature and low humidity (temperature: 10° C., relative humidity: 15%, hereinafter may be referred to as an LL environment). After the printing in the LL environment, the evaluation apparatus was left to stand for two hours.

Next, a solid image (an image with an image density of 100%) was printed as an evaluation image on a sheet of paper in the LL environment. Thereafter, a film thickness $T_2$ of the charge transport layer of the multi-layer photosensitive member was measured. An abrasion amount ($T_1$-$T_2$, unit: μm), which indicates a change in the film thickness of the charge transport layer before and after the printing, was calculated. The calculated abrasion amounts are indicated in Tables 1 to 4. Note that a smaller abrasion amount indicates more excellent abrasion resistance of the multi-layer photosensitive member.

<Evaluation of Filming Resistance>

Filming resistance was evaluated for each of the multi-layer photosensitive members (A-1) to (A-22) and (B-1) to (B-3). Filming rate evaluation and image evaluation described below were performed as evaluation of the filming resistance.

(Filming Rate Evaluation)

After the printing in the above-described evaluation of abrasion resistance, the multi-layer photosensitive member was taken out of the evaluation apparatus. The surface of the multi-layer photosensitive member (i.e., the surface of the charge transport layer) was observed using an optical microscope ("Senar K•K" produced by NIKON CORPORATION). Thus, an observation image was obtained. Observation was carried out under the following conditions: the field of view of the optical microscope was 1.7 mm×2.1 mm; and the observation magnification was 50-fold. Next, binarization was performed on the obtained observation image under a condition of a threshold brightness value of 180 using image analysis software (Image J). A ratio of an area of extraneous matter to the entire area of the image was calculated through analysis of the binarized image. Specifically, a pixel having a brightness value smaller than the threshold brightness value was determined as a region where filming occurred. Also, a pixel having a brightness value not smaller than the threshold brightness value was determined as a region where filming did not occur. A total area (Af) of regions where filming occurred and a total area (An) of regions where filming did not occur were obtained from the analyzed image. An area ratio (A, unit: %) of the regions where filming occurred was calculated from the obtained Af and An based on an equation: "Area ratio A=100×Af/(Af+An)".

The area ratio A was calculated for three parts of the multi-layer photosensitive member. An average area ratio A was determined by dividing a sum of respective area ratios A at the three parts by 3. The average area ratio A was determined as a filming ratio. Filming ratios determined as above are indicated in Tables 1 to 4. Note that a smaller filming ratio indicates less likeliness of occurrence of filming on the surface of the multi-layer photosensitive member.

(Image Evaluation)

The evaluation image printed in the above-described evaluation of abrasion resistance was visually observed to determine presence or absence of a void defect.

The image was evaluated by the following criteria. Results of the image evaluation are indicated in Tables 1 to 4. Note that a void defect tends to occur in a formed image when filming occurs on the surface of the multi-layer photosensitive member.

(Evaluation Criteria)

Excellent: No void defect was observed in the evaluation image.

Good: A slight void defect was observed in the evaluation image, but was negligible enough in practical use of the multi-layer photosensitive member.

Bad: A void defect was clearly observed in the evaluation image.

<Evaluation of Charge Characteristic>

A charge characteristic was evaluated for each of the multi-layer photosensitive members (A-1) to (A-22) and (B-1) to (B-3) in an environment at a temperature of 23° C. and a relative humidity of 50%. Specifically, the multi-layer photosensitive member was charged using a drum sensitivity test device (product of Gen-Tech, Inc.) under the following conditions: a rotational speed of the multi-layer photosensitive member was 31 rpm; and an electric current flowing into the multi-layer photosensitive member was −10 μA. The surface potential of the charged multi-layer photosensitive member was measured. The measured surface potential was determined as a charge potential ($V_0$, unit: −V) of the multi-layer photosensitive member. Charge potentials ($V_0$) of the respective multi-layer photosensitive members are indicated in Tables 1 to 4.

<Evaluation of Sensitivity Characteristic>

A sensitivity characteristic was evaluated for each of the multi-layer photosensitive members (A-1) to (A-22) and (B-1) to (B-3) in an environment at a temperature of 23° C. and a relative humidity of 50%. Specifically, the surface of the multi-layer photosensitive member was charged to −600 V using a drum sensitivity test device (product of Gen-Tech, Inc.). Then, the surface of the multi-layer photosensitive member was irradiated with monochromatic light (wavelength: 780 nm, light exposure amount: 0.8 μJ/cm$^2$) extracted from light of a halogen lamp using a bandpass filter. The surface potential of the multi-layer photosensitive member was measured when 80 milliseconds elapsed after completion of the irradiation with the monochromatic light.

The measured surface potential was determined as a post-exposure potential ($V_L$, unit: −V) of the multi-layer photosensitive member. Post-exposure potentials ($V_L$) of the respective multi-layer photosensitive members are indicated in Tables 1 to 4. Note that a smaller absolute value of the post-exposure potential ($V_L$) indicates a more excellent sensitivity characteristic of the multi-layer photosensitive member.

In Tables 1 to 4, "HTM", "Resin", "$V_0$", and "$V_L$" indicate the hole transport material, the binder resin, the charge potential, and the post-exposure potential, respectively. In Tables 1 to 4, the ratio p indicates the ratio of the number of the repeating units (2-1) to a sum of the number of the repeating units (2-1) and the number of the repeating units (2-2).

TABLE 1

| | Multi-layer photosensitive member | HTM | Charge transport layer | | | | | Charge characteristic $V_0$ [−V] | Sensitivity characteristic $V_L$ [−V] | Abrasion resistance Abrasion amount [μm] | Filming resistance Filming ratio [%] | Image evaluation |
|---|---|---|---|---|---|---|---|---|---|---|---|---|
| | | | Resin | | | | | | | | | |
| | | | Type | Repeating unit (1) | Repeating unit (2) | Terminal group (3) | Ratio p | | | | | |
| Example 1 | A-1 | HTM-1 | R-1-M1 | 1-1 | 2-1C/2-2A | M1 | 0.50 | 680 | 50 | 1.5 | 2.0 | Excellent |
| Example 2 | A-2 | HTM-2 | R-1-M1 | 1-1 | 2-1C/2-2A | M1 | 0.50 | 677 | 63 | 1.6 | 1.4 | Excellent |
| Example 3 | A-3 | HTM-3 | R-1-M1 | 1-1 | 2-1C/2-2A | M1 | 0.50 | 669 | 64 | 1.4 | 1.4 | Excellent |
| Example 4 | A-4 | HTM-4 | R-1-M1 | 1-1 | 2-1C/2-2A | M1 | 0.50 | 690 | 38 | 1.7 | 1.8 | Excellent |
| Example 5 | A-5 | HTM-5 | R-1-M1 | 1-1 | 2-1C/2-2A | M1 | 0.50 | 679 | 40 | 1.4 | 2.0 | Excellent |
| Example 6 | A-6 | HTM-6 | R-1-M1 | 1-1 | 2-1C/2-2A | M1 | 0.50 | 689 | 44 | 1.5 | 1.7 | Excellent |
| Example 7 | A-7 | HTM-7 | R-1-M1 | 1-1 | 2-1C/2-2A | M1 | 0.50 | 680 | 49 | 1.4 | 2.0 | Excellent |
| Example 8 | A-8 | HTM-8 | R-1-M1 | 1-1 | 2-1C/2-2A | M1 | 0.50 | 680 | 89 | 1.6 | 1.0 | Excellent |
| Example 9 | A-9 | HTM-9 | R-1-M1 | 1-1 | 2-1C/2-2A | M1 | 0.50 | 684 | 45 | 1.8 | 1.8 | Excellent |
| Example 10 | A-10 | HTM-10 | R-1-M1 | 1-1 | 2-1C/2-2A | M1 | 0.50 | 637 | 123 | 1.5 | 1.3 | Excellent |

TABLE 2

| | Multi-layer photosensitive member | HTM | Charge transport layer | | | | | Charge characteristic $V_0$ [−V] | Sensitivity characteristic $V_L$ [−V] | Abrasion resistance Abrasion amount [μm] | Filming resistance Filming ratio [%] | Image evaluation |
|---|---|---|---|---|---|---|---|---|---|---|---|---|
| | | | Resin | | | | | | | | | |
| | | | Type | Repeating unit (1) | Repeating unit (2) | Terminal group (3) | Ratio p | | | | | |
| Example 11 | A-11 | HTM-1 | R-2-M1 | 1-1 | 2-1C/2-2B | M1 | 0.50 | 681 | 49 | 1.5 | 1.8 | Excellent |
| Example 12 | A-12 | HTM-1 | R-3-M1 | 1-2 | 2-1C/2-2A | M1 | 0.50 | 683 | 48 | 1.6 | 0.5 | Excellent |
| Example 13 | A-13 | HTM-1 | R-4-M1 | 1-2 | 2-1C/2-2A | M1 | 0.30 | 674 | 46 | 1.6 | 0.9 | Excellent |
| Example 14 | A-14 | HTM-1 | R-5-M1 | 1-2/1-3 | 2-1C/2-2A | M1 | 0.10 | 679 | 49 | 1.9 | 1.3 | Excellent |
| Example 15 | A-15 | HTM-1 | R-6-M1 | 1-2 | 2-1C/2-2B | M1 | 0.50 | 680 | 44 | 1.7 | 0.7 | Excellent |
| Example 16 | A-16 | HTM-1 | R-7-M1 | 1-2 | 2-1C/2-2D | M1 | 0.50 | 685 | 49 | 1.9 | 1.3 | Excellent |

TABLE 3

| | Multi-layer photosensitive member | HTM | Charge transport layer | | | | | Charge characteristic $V_0$ [−V] | Sensitivity characteristic $V_L$ [−V] | Abrasion resistance Abrasion amount [μm] | Filming resistance Filming ratio [%] | Image evaluation |
|---|---|---|---|---|---|---|---|---|---|---|---|---|
| | | | Resin | | | | | | | | | |
| | | | Type | Repeating unit (1) | Repeating unit (2) | Terminal group (3) | Ratio p | | | | | |
| Example 17 | A-17 | HTM-1 | R-8-M1 | 1-4 | 2-1C/2-2A | M1 | 0.50 | 669 | 50 | 2.5 | 2.1 | Excellent |
| Example 18 | A-18 | HTM-1 | R-9-M1 | 1-1 | 2-2A | M1 | — | 678 | 45 | 2.5 | 2.7 | Good |
| Example 19 | A-19 | HTM-1 | R-10-M1 | 1-2 | 2-1C/2-2A | M1 | 0.70 | 683 | 49 | 1.3 | 0.4 | Excellent |
| Example 20 | A-20 | HTM-1 | R-1-M2 | 1-1 | 2-1C/2-2A | M2 | 0.50 | 675 | 44 | 1.5 | 3.3 | Good |
| Example 21 | A-21 | HTM-1 | R-1-M3 | 1-1 | 2-1C/2-2A | M3 | 0.50 | 676 | 40 | 1.4 | 2.2 | Excellent |
| Example 22 | A-22 | HTM-1 | R-1-M4 | 1-1 | 2-1C/2-2A | M4 | 0.50 | 689 | 46 | 1.6 | 2.5 | Excellent |

TABLE 4

| Multi-layer photo-sensitive member | HTM | Charge transport layer | | | | Charge characteristic $V_O$ [-V] | Sensitivity characteristic $V_L$ [-V] | Abrasion resistance Abrasion amount [μm] | Filming resistance | |
|---|---|---|---|---|---|---|---|---|---|---|
| | | Type | Resin | | | | | | Filming | |
| | | | Repeating unit (1) | Repeating unit (2) | Terminal group (3) | Ratio p | | | ratio [%] | Image evaluation |
| Comparative example 1 | B-1 | HTM-1 | R-1-MA | 1-1 | 2-1C/2-2A | MA | 0.50 | 678 | 45 | 1.7 | 4.8 | Bad |
| Comparative example 2 | B-2 | HTM-2 | R-1-MA | 1-1 | 2-1C/2-2A | MA | 0.50 | 680 | 49 | 1.8 | 4.5 | Bad |
| Comparative example 3 | B-3 | HTM-1 | R-1-MB | 1-1 | 2-1C/2-2A | MB | 0.50 | 665 | 53 | 1.8 | 3.9 | Bad |

Each of the multi-layer photosensitive members (A-1) to (A-22) contained a polyarylate resin including at least one type of repeating unit (1), at least one type of repeating unit (2), and the terminal group (3). Therefore, the multi-layer photosensitive members (A-1) to (A-22) each had a filming rate of no greater than 3.3%, as indicated in Tables 1 to 3. Also, the multi-layer photosensitive members (A-1) to (A-22) were each evaluated as excellent or good in the image evaluation. These results show that the multi-layer photosensitive members (A-1) to (A-22) were excellent in filming resistance.

By contrast, the multi-layer photosensitive members (B-1) to (B-3) each contained a polyarylate resin including the terminal group (MA) or (MB). The terminal groups (MA) and (MB) were not a terminal group represented by general formula (3). Specifically, a moiety of the terminal group (MA) corresponding to $R^f$ in general formula (3) was not a chain aliphatic group having at least one fluoro group. Also, a moiety of the terminal group (MB) corresponding to $R^f$ in general formula (3) was not a chain aliphatic group. Therefore, the multi-layer photosensitive members (B-1) to (B-3) each had a filming rate of at least 3.9%, as indicated in Table 4. Also, the multi-layer photosensitive members (B-1) to (B-3) were each evaluated as bad in the image evaluation. These results show that the multi-layer photosensitive members (B-1) to (B-3) were poor in filming resistance.

Among the multi-layer photosensitive members (A-1) to (A-22), the multi-layer photosensitive members (A-1) to (A-17), (A-19), (A-21), and (A-22) each contained a polyarylate resin including at least two types of repeating units (2). Also, this polyarylate resin included at least the repeating unit (2-1) and the repeating unit (2-2) as the repeating units (2). Therefore, the multi-layer photosensitive members (A-1) to (A-17), (A-19), (A-21), and (A-22) were each evaluated as excellent in the image evaluation and particularly excellent in filming resistance, as indicated in Tables 1 to 3.

Among the multi-layer photosensitive members (A-1) to (A-22), the multi-layer photosensitive members (A-1) to (A-11) and (A-20) to (A-22) each contained a polyarylate resin including a repeating unit represented by general formula (1) in which $R^1$, $R^2$, $R^3$, and $R^4$ each represent a hydrogen atom, $R^5$ represents a methyl group, and $R^6$ represents an ethyl group. Therefore, the multi-layer photosensitive members (A-1) to (A-11) and (A-20) to (A-22) each had a small abrasion amount and were each excellent in abrasion resistance as well as in filming resistance, as indicated in Tables 1 to 3.

Among the multi-layer photosensitive members (A-1) to (A-22), the multi-layer photosensitive members (A-12) to (A-16) and (A-19) each contained a polyarylate resin including a repeating unit represented by general formula (1) in which $R^1$ and $R^3$ each represent a methyl group, $R^2$ and $R^4$ each represent a hydrogen atom, and $R^5$ and $R^6$ bond together to represent a cycloalkylidene group having a carbon number of at least 5 and no greater than 7. Therefore, the multi-layer photosensitive members (A-12) to (A-16) and (A-19) each had a small abrasion amount and were each excellent in abrasion resistance as well as in filming resistance, as indicated in Tables 2 and 3.

Among the multi-layer photosensitive members (A-1) to (A-22), the multi-layer photosensitive members (A-1) to (A-9) and (A-11) to (A-22) each included a charge transport layer containing the compound (10), (11), or (12) as a hole transport material. Specifically, the charge transport layer contained any of the compounds (HTM-1) to (HTM-9) as the hole transport material. Therefore, the multi-layer photosensitive members (A-1) to (A-9) and (A-11) to (A-22) were excellent in the sensitivity characteristic as well as in filming resistance, as indicated in Tables 1 to 3.

Among the multi-layer photosensitive members (A-1) to (A-22), the multi-layer photosensitive members (A-1) to (A-10), (A-21), and (A-22) each contained a polyarylate resin including the repeating unit (1-1), the repeating unit (2-1C), the repeating unit (2-2A), and the terminal group (M1), (M3), or (M4). Therefore, the multi-layer photosensitive members (A-1) to (A-10), (A-21), and (A-22) each had a particularly low filming ratio, were each evaluated as excellent in the image evaluation, and were each particularly excellent in filming resistance, as indicated in Tables 1 to 3.

The above results show that occurrence of filming can be prevented when the polyarylate resin according to the present disclosure is contained in a photosensitive layer. The above results also show that occurrence of filming can be prevented through use of the photosensitive member according to the present disclosure.

What is claimed is:

1. An electrophotographic photosensitive member comprising
a conductive substrate and a photosensitive layer, wherein the photosensitive layer contains a charge generating material, a hole transport material, and a binder resin, the binder resin includes a polyarylate resin,
the polyarylate resin is any one of:
a resin including a repeating unit (1-2) represented by a chemical formula (1-2) shown below, a repeating unit (2-1C) represented by a chemical formula (2-1C) shown below, a repeating unit (2-2A) represented by a chemical formula (2-2A) shown below, and a terminal group represented by a chemical formula (M1) shown below, a ratio of a number of the repeating units (2-1C) to a sum of a number of the repeating units (2-1C) and a number of the repeating units (2-2A) being 0.30;

a resin including the repeating unit (1-2) represented by the chemical formula (1-2) shown below, the repeating unit (2-1C) represented by the chemical formula (2-1C) shown below, the repeating unit (2-2A) represented by the chemical formula (2-2A) shown below, and the terminal group represented by the chemical formula (M1) shown below, the ratio of the number of the repeating units (2-1C) to the sum of the number of the repeating units (2-1C) and the number of the repeating units (2-2A) being 0.50; or a resin including the repeating unit (1-2) represented by the chemical formula (1-2) shown below, the repeating unit (2-1C) represented by the chemical formula (2-1C) shown below, a repeating unit (2-2B) represented by a chemical formula (2-2B) shown below, and the terminal group represented by the chemical formula (M1) shown below, a ratio of the number of the repeating units (2-1C) to a sum of the number of the repeating units (2-1C) and a number of the repeating units (2-2B) being 0.50, and the hole transport material includes a compound represented by a general formula (10) shown below,

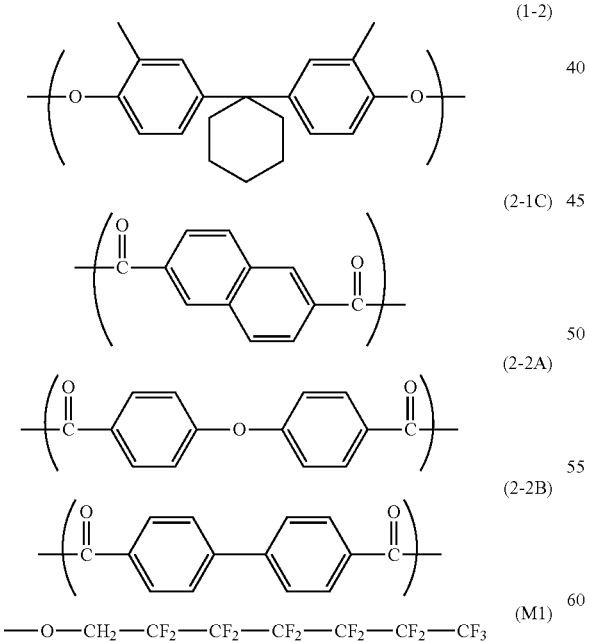

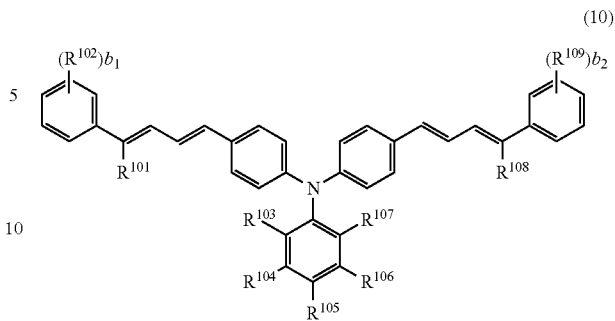

in the general formula (10),
$R^{101}$, $R^{103}$, $R^{104}$, $R^{105}$, $R^{106}$, $R^{107}$ and $R^{108}$ each represent, independently of one another, a hydrogen atom, an alkyl group having a carbon number of at least 1 and no greater than 8, a phenyl group optionally having an alkyl group having a carbon number of at least 1 and no greater than 8, or an alkoxy group having a carbon number of at least 1 and no greater than 8, two adjacent chemical groups among $R^{103}$, $R^{104}$, $R^{105}$, $R^{106}$, and $R^{107}$ may bond together to represent a cycloalkane having a carbon number of at least 5 and no greater than 7, $R^{102}$ and $R^{109}$ each represent, independently of one another, a phenyl group, an alkyl group having a carbon number of at least 1 and no greater than 8, or an alkoxy group having a carbon number of at least 1 and no greater than 8, and $b_1$ and $b_2$ each represent, independently of one another, an integer of at least 0 and no greater than 5.

2. The electrophotographic photosensitive member according to claim 1, wherein
the photosensitive layer includes a charge generating layer and a charge transport layer,
the charge generating layer contains the charge generating material, and
the charge transport layer contains the hole transport material and the binder resin.

3. The electrophotographic photosensitive member according to claim 1, wherein
the hole transport material includes a compound represented by a chemical formula (HTM-1) shown below,

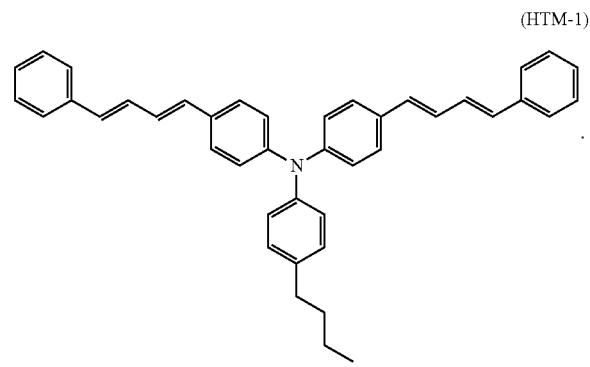 [SMILES: CCCCc1ccc(N(c2ccc(/C=C/C=C/c3ccccc3)cc2)c2ccc(/C=C/C=C/c3ccccc3)cc2)cc1]

* * * * *